United States Patent
Lee

(10) Patent No.: US 7,120,194 B2
(45) Date of Patent: Oct. 10, 2006

(54) SYSTEM FOR MOVING IMAGE DATA USING WIRELESS COMMUNICATION AND THE METHOD OF THE SAME

(75) Inventor: Dong Heon Lee, Seoul (KR)

(73) Assignee: Neomtel Co. Ltd., Seoul (KR)

( * ) Notice: Subject to any disclaimer, the term of this patent is extended or adjusted under 35 U.S.C. 154(b) by 729 days.

(21) Appl. No.: 10/168,494
(22) PCT Filed: Dec. 22, 2000
(86) PCT No.: PCT/KR00/01511

§ 371 (c)(1),
(2), (4) Date: Jun. 21, 2002

(87) PCT Pub. No.: WO01/50766

PCT Pub. Date: Jul. 12, 2001

(65) Prior Publication Data

US 2003/0093817 A1    May 15, 2003

(30) Foreign Application Priority Data

Dec. 22, 1999 (KR) ............................... 1999-60368
Jul. 25, 2000 (KR) ............................... 2000-42840

(51) Int. Cl.
*H04B 1/66* (2006.01)
(52) U.S. Cl. .................................. 375/240.01
(58) Field of Classification Search ........... 375/240.01, 375/240.03, 240.08, 240.09; 348/14.09, 348/17; 382/236; H04B 1/66
See application file for complete search history.

(56) References Cited

U.S. PATENT DOCUMENTS

| 5,493,638 | A | | 2/1996 | Hooper et al. |
| 5,835,129 | A | * | 11/1998 | Kumar ............... 348/14.09 |
| 5,886,743 | A | | 3/1999 | Oh et al. |
| 6,351,565 | B1 | * | 2/2002 | Boon ................. 382/236 |
| 6,512,793 | B1 | * | 1/2003 | Maeda ............... 375/240.08 |
| 6,580,756 | B1 | * | 6/2003 | Matsui et al. ......... 375/240.08 |

FOREIGN PATENT DOCUMENTS

| KR | 99-00088233 | 12/1999 |
| KR | 10-0273877 | 9/2000 |

* cited by examiner

*Primary Examiner*—Tung Vo
(74) *Attorney, Agent, or Firm*—Pepper Hamilton LLP

(57) ABSTRACT

A home multimedia storage system includes an analog storing part for storing analog signal from a displayer in a video tape and playing the stored analog signal, and an analog/digital converting part for converting an analog signal from the displayer into a digital signal. A digital storing part is provided to store the digital signal converted by the analog/digital converting part and playing the stored digital signal. A digital/analog converting part also provided to convert the digital data output from the digital storing part into an analog play signal. A controller selects and transmits one of the analog signal stored in the analog storing part and the digital signal stored in the digital storing part to the displayer during a sound/image playback operation.

24 Claims, 21 Drawing Sheets

| the number of movement data |
| --- |
| using background color |
| used in reduced |
| inversion or not |

FIG.9

| image ID | layer | reversion | rotation | magnification | scaling algorithm | horizontal offset | vertical offset | scale factor |

FIG.10

| compression recognition | ID | transition | transparency color type | picture division | transparency color |

FIG.11
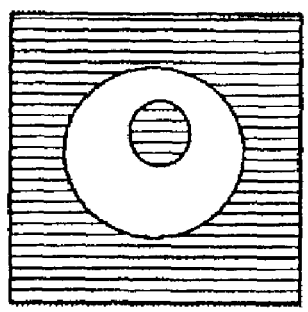
(a)
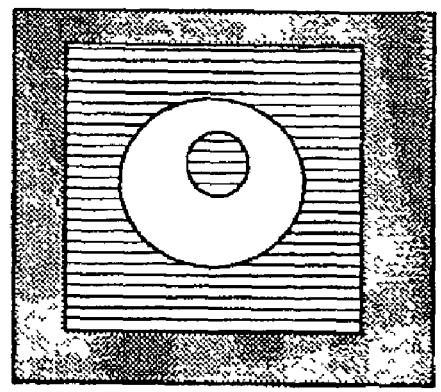
(d)
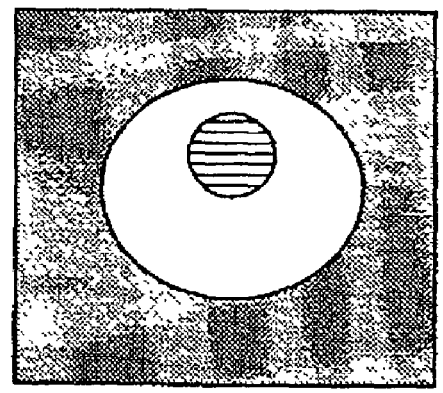
(c)
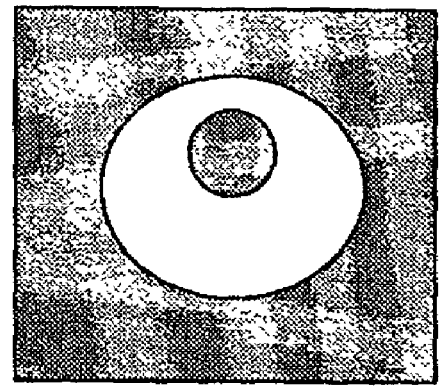
(b)

SYSTEM FOR MOVING IMAGE DATA USING WIRELESS COMMUNICATION AND THE METHOD OF THE SAME

TECHNICAL FIELD

The present invention relates to a system and method for transmitting moving picture for a mobile station, and more particularly, to system and method for effectively realizing a moving picture in a mobile station, which can generally process a relatively small capacity of information, by providing a developed data encoding algorithm.

BACKGROUND ART

Generally, mobile stations are designed to display picture as well as text so that a variety of information can be displayed. Moving picture enhances the way in which information is presented and are most preferred by user. The moving picture transmitted to mobile stations are generally used for a waiting screen or an icon. A variety of pictures as well as texts can be displayed simultaneously. By using such picture information, an interface in the form of an icon can be presented to the user and a semi-moving picture can be displayed when the station is turned on or off. It is preferable for the waiting screen to have an editing function so that the user can alter the waiting screen to a preferable format. However, when the moving picture is used as the waiting screen, it is difficult to edit the moving picture to suit the user's taste. Although it is possible for the user to select what he/she likes from a variety of moving picture, in this case, the data capacity of the moving picture is too large to store in the memory of the mobile station.

In the mean time, services like SMS(Short Message Service), WAP(Wireless Application Protocol) or MMS (Multimedia Messaging Service) are used to display moving pictures.

WAP is a standard protocol and it is possible for wireless communications like cellular phone and pager to efficiently communicate electronic mail, web service, new group and IRC(Internet Relay Chat) by WAP.

SMS has been used to transmit a message to be displayed on a screen of a mobile station through wireless communications. The SMS is realized according to the IS-637 standard, which defines the transmission method for a short message of less than 256 bytes. The SMS allows for the transmission of a message from a station system to the mobile station even when the station system is not engaged with the mobile station. The transmitted message can be displayed on the screen or stored in the memory of the mobile station.

FIG. 1 is a block diagram illustrating a general wireless communication system to transmit/receive wireless communication data. As shown in FIG. 1, wireless communication system consists of CS(Contents Server) for storing, making and providing wireless communication data, HLR(Home Location Register) for storing information of user and terminal and transmitting stored information to CS, MC(Message Center) for standardizing communication data transmitted from CS suitable for other communication devices and transmitting the standardized communication data to mobile station, MSC(Mobile Switching Center, not showed in FIG. 1) and BS(Base Station) for relaying communication data.

FIG. 2 is a flowchart illustrating communication way of a general wireless communication system. At first, CS requests terminal information from HLR, makes communication data suitable for terminal and stores formatted communication data. Then CS transmits formatted communication data to MC. MC receives the formatted data and transmits it to mobile station via MSC and BS.

Generally, there are many difficulties for prior wireless communications to efficiently transmit moving picture because the amount of communication data to transmit is so large that new communication algorithm, communication method and system are needed for efficiently communicating moving picture between wireless communications.

In addition, since data capacity of the moving picture is larger than that of the text data, encoding technology for effectively encoding the moving picture is required. However, the prior encoding technology is not suitable for mobile communication station which is designed to process moving picture.

DISCLOSURE OF INVENTION

Therefore, the present invention has been made in an effort to solve the above described needs and problems.

It is an objective of the present invention to provide a moving picture transmitting method and system that can effectively transmit moving picture to mobile station.

It is another objective of the present invention to provide a moving picture transmitting method and system that can efficiently encode moving picture to transmit and decode the encoded data transmitted using a wireless Internet service in mobile station.

To achieve several of the above objectives, the present invention provides A system for receiving moving picture data via telecommunication means, said data including at least one frame with at least one picture type, comprising, a receiving means which receives said moving picture data encoded;

a decoding means which decodes said moving picture data received;

a display means which displays said moving picture decoded by said decoding means;

wherein said picture type is classified into basic picture type and transition picture type, and said moving picture data are encoded and comprised of a) said basic picture type data which comprise said basic type picture;

b) different part picture type data which shows difference between said basic picture type data and said transition picture type data comprising said transition picture type;

c) a picture type header which displays decoding information of both said basic picture type data and said transition picture type;

d) a frame header which includes moving data defining expression way of at least one said picture type in said each frame; and e) a moving picture identifier which displays that said received data relate to data on moving picture.

The present invention provides a method for receiving moving picture data using telecommunication means, said data including at least one frame with at least one picture type, comprising steps of, receiving said moving picture data encoded;

decoding said moving picture data received; and displaying said moving picture decoded by said decoding step;

wherein a plurality of said picture types are classified into basic type picture and transition type picture, and said moving picture data are encoded and comprised of a) said basic picture type data which comprise said basic type picture;

b) different part picture type data which shows difference between said transition picture type data and said basic picture type data;

c) a picture type header which displays decoding information of both said basic picture type data and said transition picture type;

d) a frame header which includes moving data defining expressing way of at least one picture type in each said frame; and e) a moving picture identifier which displays that received data relate to data on said moving picture.

In accordance with other aspect of the present invention, A system for transmitting moving picture data using telecommunication means, said data including at least one frame with at least one picture type, comprising, an encoding means which encodes said moving picture data; and a transmitting means which transmits said moving picture data encoded, wherein said picture types are classified into basic picture type and transition picture type, and said moving picture data are encoded and comprised of a) basic picture type data which comprise said basic type picture;

b) different part picture type data which shows difference between said transition picture type data and said basic type data, said transition picture type data comprising said transition picture type;

c) a picture type header which displays decoding information of both said basic picture type data and said transition picture type;

d) a frame header which includes moving data defining expressing way of at least one picture type comprising said each frame in each frame; and e) a moving picture identifier which displays that received data relate to data on moving picture.

In accordance with other aspect of the present invention, a method for transmitting moving picture data using telecommunication means, said data including at least one frame with at least one picture type, comprising steps of, encoding said moving picture data;

transmitting said moving picture data encoded, wherein said pictures are classified into basic type picture and transition type picture, and said moving picture data are comprised of a) basic picture type data which comprise said basic type picture;

b) different part picture type data which shows difference between basic picture type data and said transition picture type data comprising said transition picture type;

c) a picture type header which displays decoding information of both said basic picture type data and said transition picture type;

d) a frame header which includes moving data defining expression way of at least one picture type comprising said each frame in each frame; and e) a moving picture identifier which displays that received data relate to data on moving picture.

In accordance with further aspect of the present invention, a system for receiving moving picture data using telecommunication means, said data including at least one frame with at least one picture type, comprising, a receiving means which receives moving picture data encoded;

a decoding means which decodes said moving picture data received; and a displaying means which displays said moving picture decoded, wherein said moving is comprised of a) data which relates to said at least one picture type;

b) picture type header which displays decoding information of said picture type data;

c) frame header which includes moving data defining expression relation of at least one picture type comprising said each frame in each frame; and d) moving picture identifier which displays that received data relate to data on moving picture.

In accordance with further aspect of the present invention, a method for receiving moving picture data using telecommunication means, said data including at least one frame with at least one picture type, comprising, receiving encoded data;

decoding said received data; and displaying said decoded moving picture, wherein said moving is comprised of a) data which relates to said at least one picture type;

b) picture type header which displays decoding information of said picture type data;

c) frame header which includes moving data defining expression relation of at least one picture type comprising said each frame in each frame; and d) moving picture identifier which displays that received data relate to data on moving picture.

BRIEF DESCRIPTION OF THE DRAWINGS

Further objects and other advantages of the present invention will be apparent from the following description in conjunction with the attached drawings, in which:

FIG. 5 illustrates the pixels having different pixel value from basic picture.

FIG. 8 shows frame header structure according to the present invention.

FIG. 9 shows structure of moving data.

FIG. 10 shows structure of picture type header of each picture type.

FIG. 11 illustrates that picture type of each frame comprising moving picture is expressed in the frame according to the present invention of method for transmitting/receiving moving picture via telecommunication.

DETAILED DESCRIPTION OF THE INVENTION

Preferred embodiments of the present invention will now be described in detail with reference to the accompanying drawings.

Figure 3:
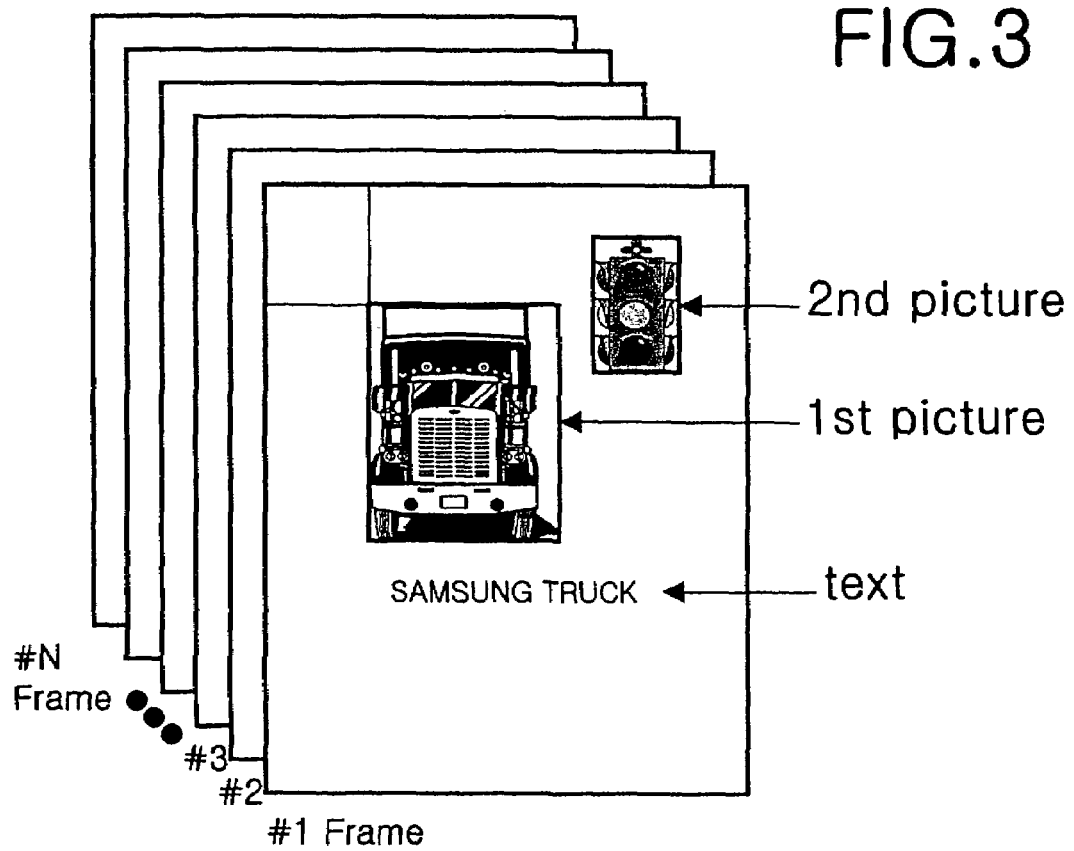
FIG. 3 shows a file format of moving picture having N frames according to a preferred embodiment of the present invention.

FIG. 3 shows a file format of moving picture having N frames according to a preferred embodiment of the present invention. Frame is each of the rectangular picture composing a strip of moving picture and it is a basic composing unit of a moving picture. A frame may consist of at least one picture, at least one text or composition of at least one picture and at least one text. Moving picture presented in FIG. 3 consists of N frames and the first frame in FIG. 3 consists of two pictures and one text. The text is well known to an ordinary person in the art of the present invention so that classification of picture according to the present invention will be described. Picture is classified into two types. The first type is basic picture and the second is transition picture. Basic picture is reference picture among pictures included in moving picture and transition picture is an picture easily formed from basic picture. There will be many methods for classifying a picture into basic picture or transition picture. For example, transition picture may be defined by a picture which is the number of pixels having different value from certain basic picture is smaller than the number of pixels having same value with certain basic picture. Also, each picture has unique identification so that a frame is defined by identification of picture and its layout information.

Figure 4:
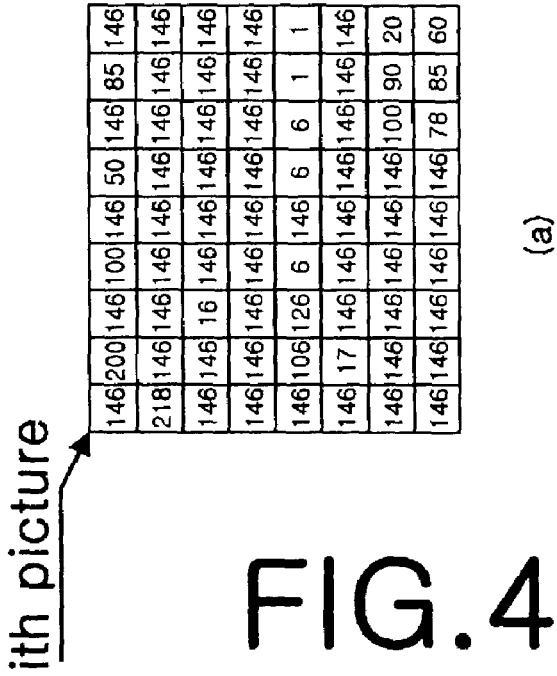
FIG. 4 illustrates the transmitting way of basic picture type.

FIG. 4 illustrates the transmitting way of basic picture. FIG. 4(*a*) shows a basic picture having 2 dimensional arrays with 8 horizontal pixels and 9 vertical pixels. The pixel values of 2 dimensional arrays are sequentially transmitted by byte or bit. As shown in FIG. 4(*b*), the 1st horizontal pixels, the 2nd horizontal pixels, . . . , and the $8^{th}$ horizontal pixels are transmitted sequentially. The first horizontal pixels are transmitted by byte like "146 200 218 . . . 146 85 146". Practically, the first horizontal pixel are transmitted by converted bit sequence like "10010010 11001000 110110 10 . . . 10010010 01010101 10010010".

Figure 5:
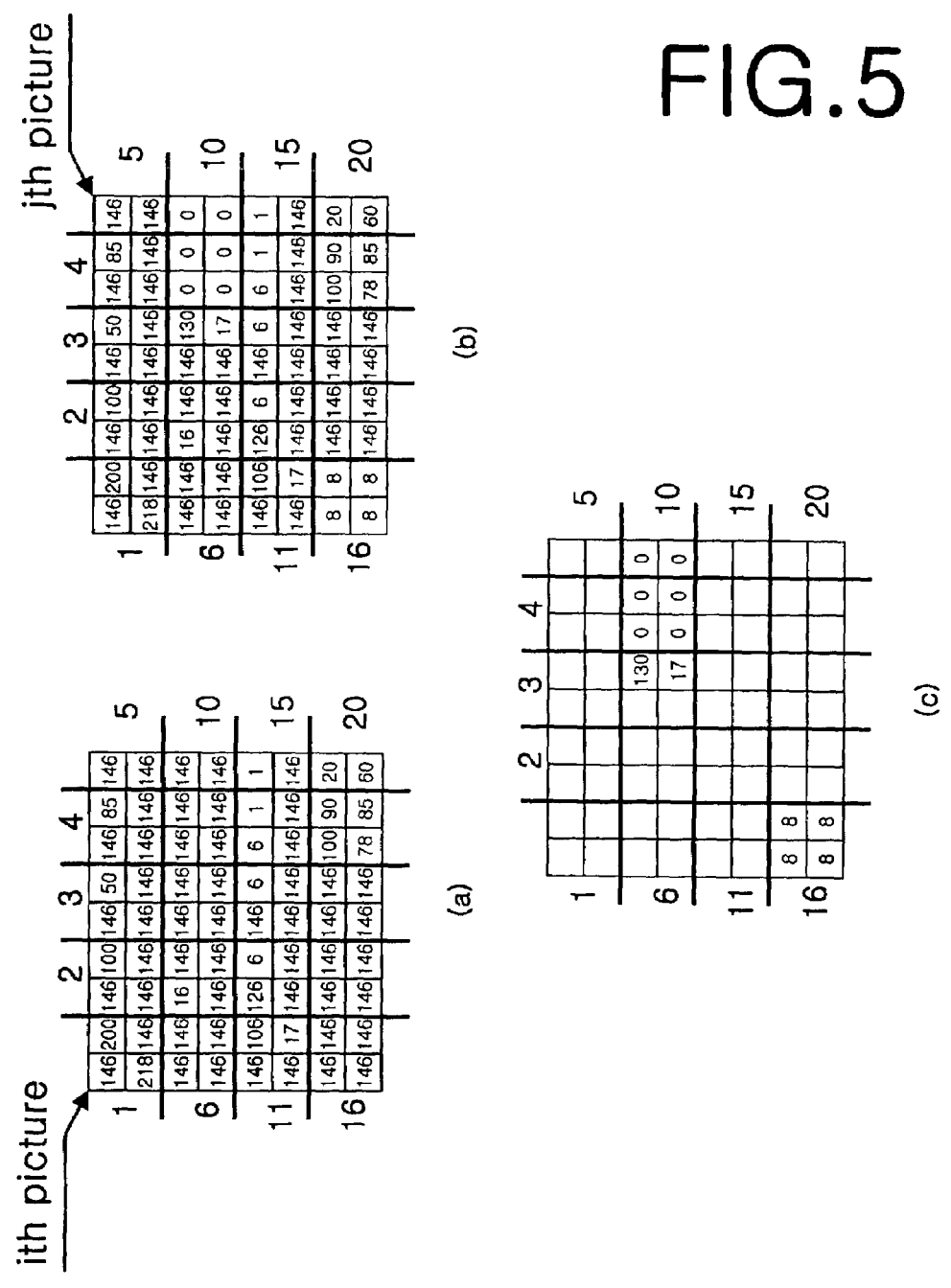

FIG. 5 illustrates the pixels having different pixel value from basic picture. Generally, basic picture is defined by an picture which is used many times or a standard picture from which other pictures are easily generated and usually can be selected by the manufacturer of moving picture. That is to say, transition picture is defined by a picture which can be easily generated from basic picture by adding certain effects. These effects, for example, include rotation, shift or magnification. Practically, a picture to classify and basic picture are divided into plural blocks with arbitrary m bits in the direction of X and arbitrary n bits in the direction of Y. And then, the blocks of a picture to classify are compared with those of basic picture. If the number of blocks having different pixel value from basic picture is larger than an arbitrary value, a picture is classified into transition picture.

"(⅔)×number of total blocks" is calculated and the result is rounded off or ignored to the integer. The result value (integer) is defined as critical value statistically. If the block number is over the critical value FIG. 5(*a*) indicates i th picture, FIG. 5(*b*) indicates j th picture and FIG. 5(*c*) indicates pixels of j th picture having different pixel value from i th picture. Each picture of FIG. 5(*a*) and FIG. 5(*b*) consists of 9 pixels in the direction of X and 8 pixels in the direction of Y and is also divided into 20 blocks. Each block has 2 pixels in the direction of X and 2 pixels in the direction of Y. The size of block can be arbitrary determined by the operator of moving picture. Suppose i th picture is basic picture and j th picture type is transition picture, FIG. 5(*c*) indicates pixels of j th picture having different pixel value from i th picture. When j th picture of FIG. 5(*b*) tries to be transmitted, the whole blocks of j th picture do not need to be transmitted. Instead, the identification of i th picture and only blocks with different value from i th picture can be transmitted to transmit j th picture so that the data size to transmit will be decreased.

Figure 6:
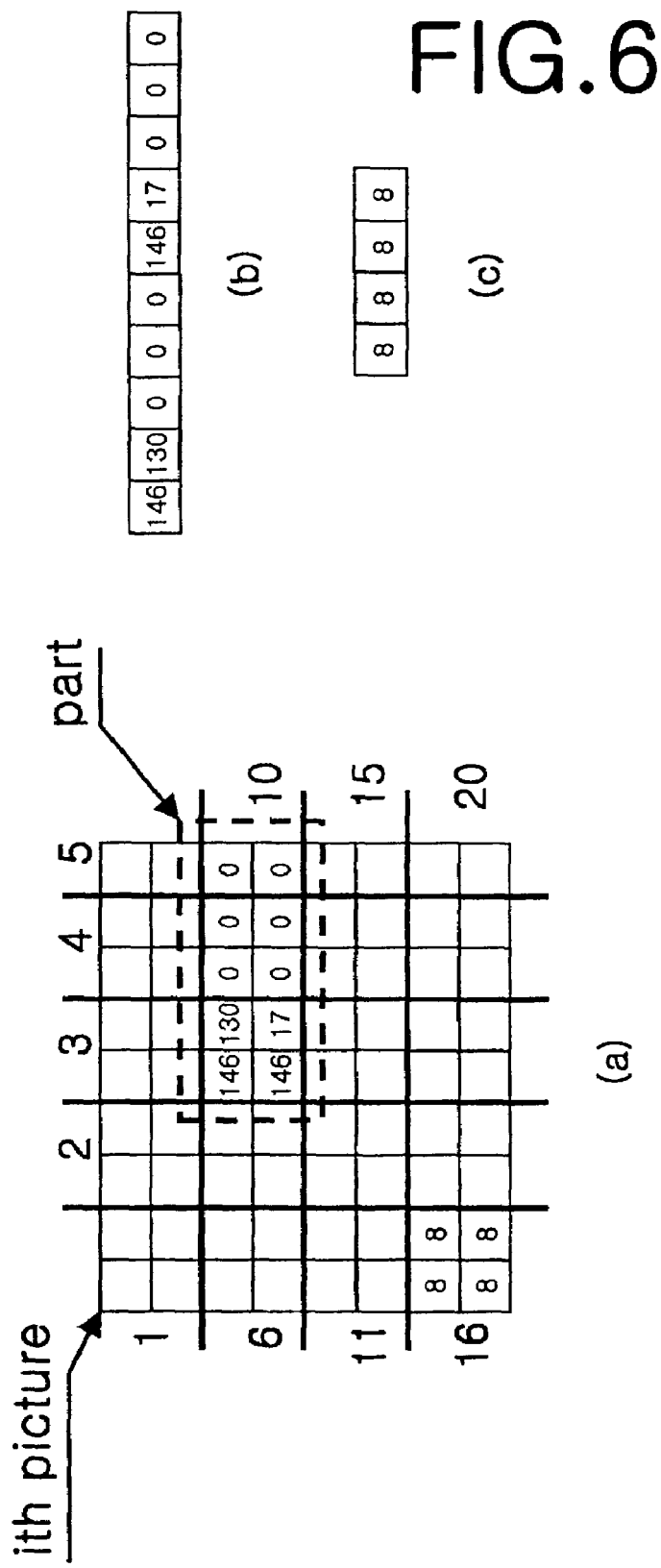
FIG. 6 illustrates transmitting method of blocks having different pixel value from basic picture in transition picture.

FIG. 6 illustrates transmitting method of blocks having different pixel value from basic picture in transition picture. J th picture presented in FIG. 6(*a*) consists of 20 blocks and FIG. 6(*a*) shows that $8^{th}$ block, $9^{th}$ block, $10^{th}$ block and $16^{th}$ block among 20 blocks have different pixel value from basic picture. If blocks having different pixel value from basic picture are occurred in series like $8^{th}$ block, $9^{th}$ block and $10^{th}$ block shown in FIG. 6(*a*), blocks in series are combined into a part. To transmit the part, the information of "starting block number and ending block number" and pixel values of the part are transmitted. When pixel values of the part are transmitted, the horizontal pixels values are first transmitted and then the vertical pixels values are transmitted. FIG. 6(*b*) illustrates the transmitting way of the part is comprised of $8^{th}$ block, $9^{th}$ block, $10^{th}$ block. The horizontal pixel values of "146 130 0 0 0" are first transmitted and then the vertical pixel values of "146 17 0 0 0" are transmitted. If blocks having different pixel value from basic picture type are not in series, each block is transmitted with its block number as shown in FIG. 6(*c*).

Figure 1:
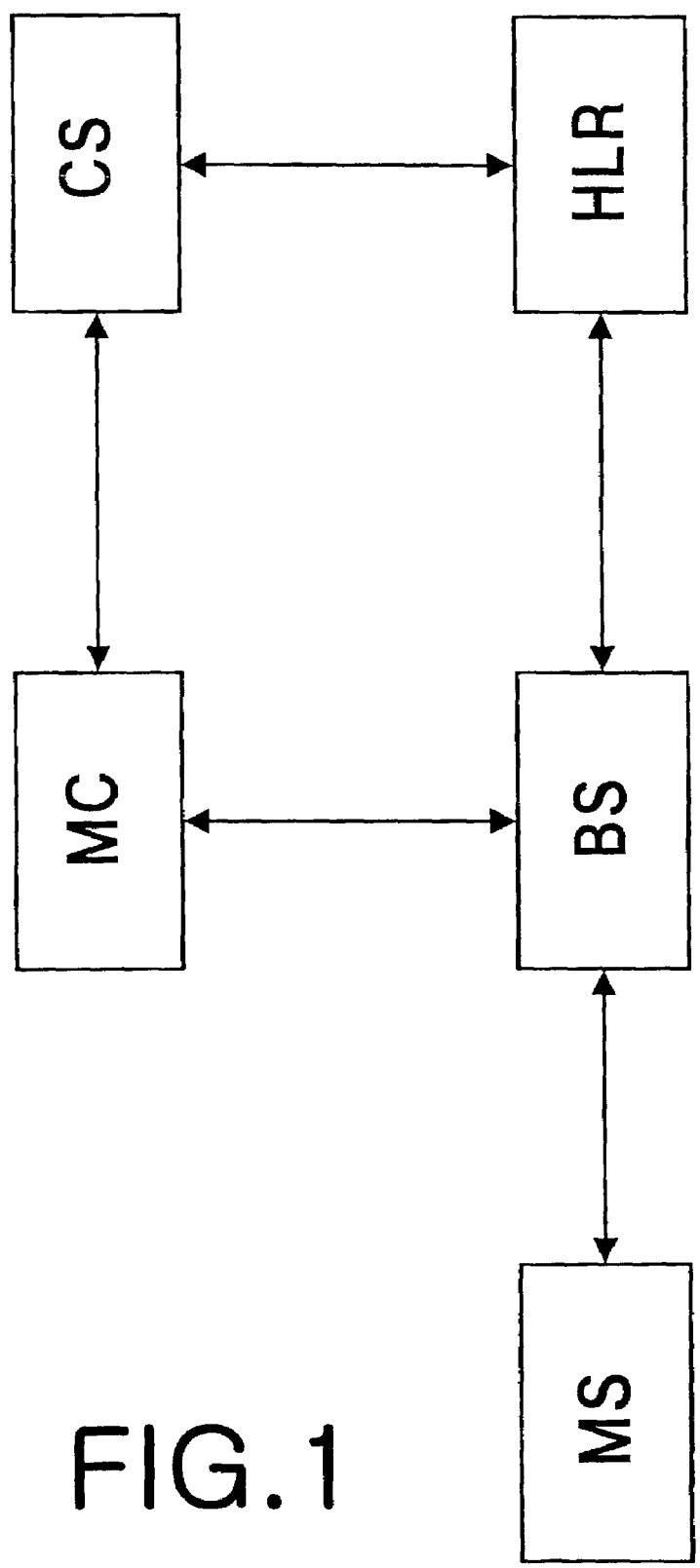
FIG. 1 is a block diagram illustrating a general wireless communication system to transmit/receive wireless communication data.
Figure 2:
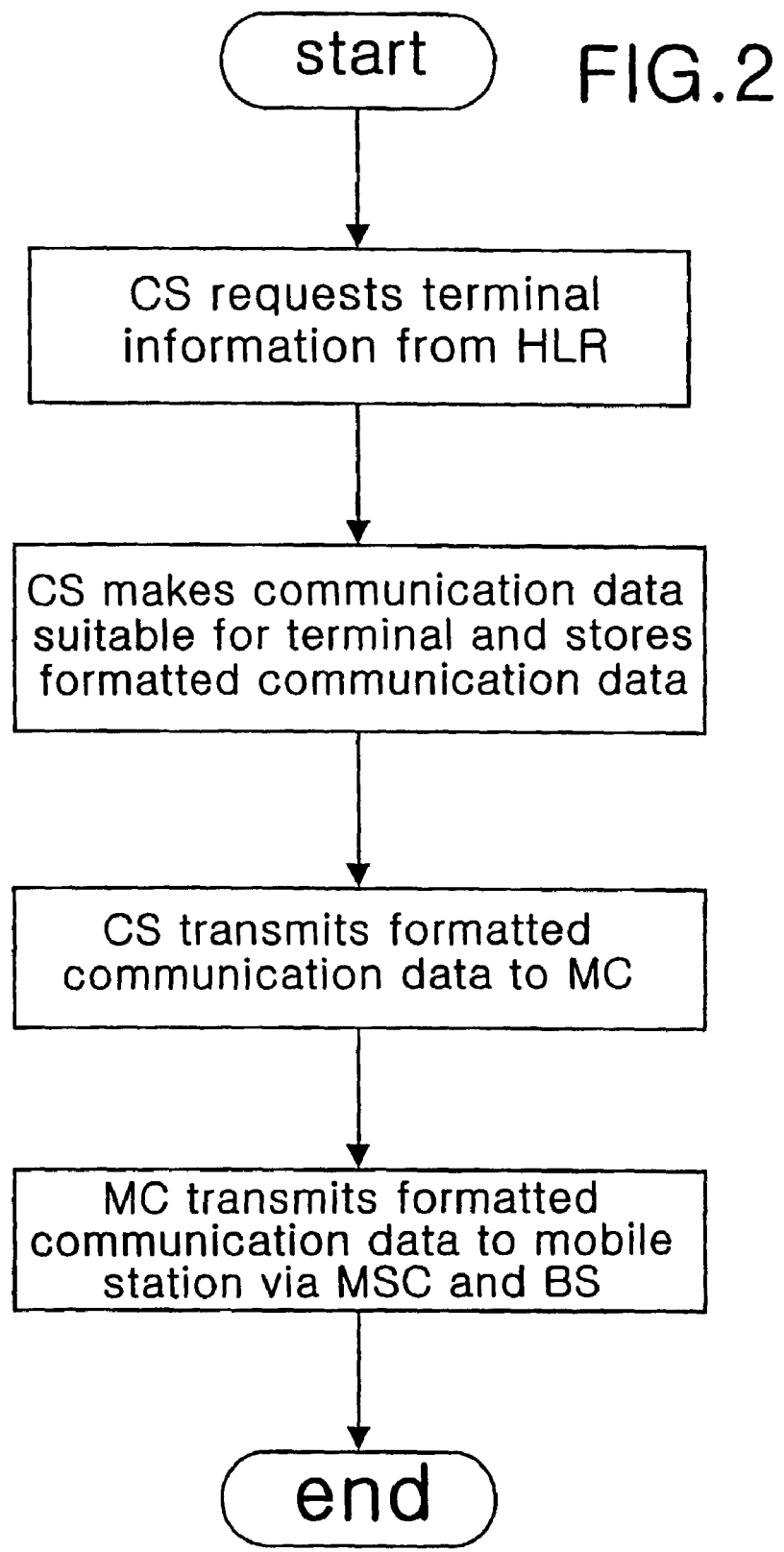
FIG. 2 is a flowchart illustrating communication way of a general wireless communication system.
Figure 7:
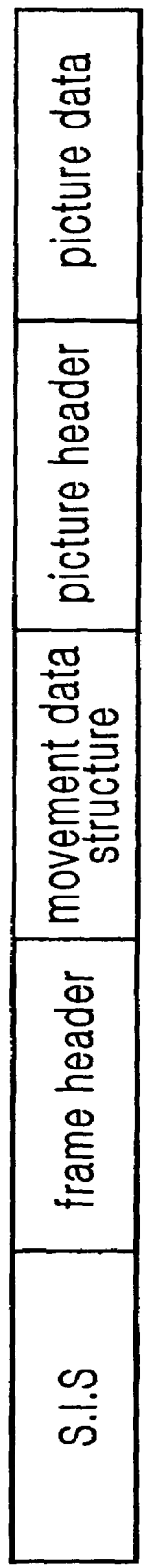
FIG. 7 shows moving picture structure according to the present invention.

FIG. 7 shows moving picture structure according to the present invention. Moving picture is fitted and encoded in CS(Contents Server) as shown in FIG. 2. CS receives the user terminal specification and user information from HLR (Home Location Register) and pictures included in each frame of moving picture are fitted suitable to user terminal specification and then fitted moving picture is encoded according to the algorithm of the present invention. As shown in FIG. 7, the moving picture according to the present invention consists of S.I.S.(Simple Picture Service) Identifier, frame header, movement data structure, picture header and picture data. Table 1 shows picture header format of S.I.S.

TABLE 1

| No. | Field | Size (Byte) | Description |
|---|---|---|---|
| | | | moving picture information part |
| 1 | Image Identifier | 3 | 'S','I','S' |
| 2 | SIS version | 1 | b7 b6 b5 b4 b3 b2 b1 b0 \| MSBs \| \| LSBs \| MSBs = 1–20: Binary SIS version 1.0 MSBs = 0: 4 Gray or 256 Color version MSBs = 28: Binary SIS, LSBs = version(not 1.0) MSBs = 29: 4 Gray SIS, LSBs = version MSBs = 30: 256 Color SIS, LSBs = version |
| 3 | Image size | 2 | the size of total image |
| 4 | Horizontal size | 1 | the horizontal size of a frame by pixel unit |
| 5 | Vertical size | 1 | the vertical size of a frame by pixel unit |
| 6 | Inversion status | 1 | field showing total image is inversed or not |
| | | | Frame Information Part |
| 7 | The number of frames | 1 | |
| 8 | Frame No. of freeze-frame | 1 | b7: flag showing freeze-frame use b6–b0: Frame No. used for freeze-frame |
| 9 | The number of representative frames | 1 | b7: flag showing representative frames use b6–b0: the number of frames used for representative frames |
| 10 | Frame duration | 1 | b7: flag showing variable duration b6–b0: frame duration (unit: 100 ms) |
| 11 | Variable delay | | the interval between frame if variable duration is used (This flag is useless if variable duration is not used) |
| 12 | The number of layers | 1 | The number of layers to use |
| 13 | Repeat flag | 1 bit | field showing frame repeat |
| 14 | color palette | 1 bit | field showing 256 color palette use |
| 15 | better compression | 1 bit | |
| 16 | reserved | 5 bits | |
| 17 | gray palette | 1 bit | field showing 256 gray scale palette use |
| 18 | palette compression | 1 bit | |
| 19 | reserved | 5 bits | |
| 20 | palette size | 2 | field showing the size of palette (only if color palette = 1 and gray palette = 0) |
| 21 | palette data | | |
| | | | Image information part |
| 22 | level of image | 1 | 1: black/white(binary) 2: 4-gray 8: 256 color 255: uncompressed 256 color bitmap |
| 23 | compression method | 1 | 0: hoffman code 1: W-code 2: arithmetic code |
| 24 | The number of image | 1 | The number of total images included in moving picture |

As shown in Table 1, SIS image header consists of moving picture information part, frame information part and image information part.

Moving picture information part consists of image identifier, S.I.S. version, image size, horizontal size, vertical size and inversion status field. Frame information part consists of the number of frames, frame no. of freeze-frame, the number of representative frames, frame duration, variable delay, the number of layers, repeat flag, color palette, compression ratio, gray palette, palette compression, palette size and palette data field. Image information part consists of level of image, compression method, the number of image.

Image identifier field consists of 3 bytes indicating 'S', 'I', and 'S' and indicates moving picture encoded by S.I.S. format.

S.I.S. version field consists of one byte and it shows the version of moving picture. The technology related to wireless data communication is progressing day by day so that the data capacity capable of transmitting at once also become larger and the speed for transmitting become faster. To adapt to these changes in the development of these technology, S.I.S. has several versions including binary version, 4 gray version, and 256 color version. S.I.S. version field consists of 8 bits and these versions are selected using LSBs and MSBs. LSBs(Least Significant Bits) is defined by bits from $1^{st}$ bit to $3^{rd}$ bit and MSBs(Most Significant Bits) is defined by bits from $4^{th}$ bit to $8^{th}$ bit. Table 1. shows versions of S.I.S. can be classified to 4 class by LSBs and MSBs. As technology related to wireless data communication develops, the number of versions could be increased.

Image size field is a field for showing the total size of moving picture including image header format.

Vertical size field and horizontal size field comprise one byte and show the vertical and the horizontal size of screen to display moving picture, respectively. Vertical size field and horizontal size field comprise one byte so that it can count up to 256 pixels. But the number of bits indicating vertical size field and horizontal size field can be extended according to the version of moving picture.

Inversion status field shows whether total frames comprising moving picture are displayed with inversion or not.

The field of the number of frames is used to show the total number of frames comprising moving picture.

The field of frame number of freeze frame is used to show whether moving picture uses freeze frame or not and this field also shows a frame number of freeze frame if moving picture uses freeze frame. Freeze frame is a representative frame selected from all frames included in moving picture and it can be used an icon representing moving picture while moving picture is not activated. The field of frame number of freeze frame consists of one byte. The most significant bit is used for a flag to decide whether freeze frame exists or not. The rest 7 bits of frame number of freeze frame shows a frame number of freeze frame. If the most significant bit is "1", it indicates that freeze frame is used in moving picture. For example, if the most significant of the field of frame number of freeze frame is "1" and the rest bits are "0001011", it means that moving picture has freeze frame and $12^{th}$ frame is used for freeze frame.

The field of the number of representative frames is used to show whether moving picture has representative frames or not and this field also shows the frame numbers of the representative frames if moving picture has representative frames. Representative frames are selected plural frames for showing characteristic of moving picture. It is possible for user to look around moving picture by using representative frames without looking all frames included moving picture. The field of the number of representative frames consists of one byte. The most significant bit is used for a flag for showing whether representative frames is used or not. The rest 7 bits of the field of the number of representative frames show the number of representative frames. If the most significant bit is "1", it indicates that representative frames are used in moving picture. For example, if the most significant of the field of the number of representative frames is "1" and the rest bits are "0000011", it means that moving picture has representative frames and four frames are used for representative frames because the rest bits of "0000000" define one.

The field of frame duration is used to show whether the running time of each frame included in moving picture is fixed or not and it also shows the running time of each frame to display if the running time is not fixed. The field of frame duration consists of one byte. The most significant bit is used for a flag for showing whether the running time of each frame is fixed or not. If the most significant bit is "1", it indicates that the running time of each frame is different frame by frame, and the rest bits are meaningless. If the most significant bit is "0", it indicates that the running time of each frame is fixed, and the rest bits indicate the running time of frame. If the most significant bit is "0" and the rest bits are "0000000", the running time of each frame is fixed to minimum value. In table 1, the minimum value is defined by 100 ms. For example, if the most significant of the field of frame duration is "0" and the rest bits are "0000101", it means that each frame included in moving picture is regularly displayed for six times of minimum value. Therefore each frame is regularly displayed for 600 ms=(100 ms)*(the decimal value of the rest bits+1).

The field of variable delay has meaning in case the most significant bit of the field of frame duration has "1". If the most significant bit of the field of frame duration is "1", it means that the running time of each frame is different. The running time of each frame is indicated in the field of variable delay so that the size of the field of variable delay is equal to the number of total frames included in moving picture. For example, the size of the field of variable delay is 10 bytes in case that moving picture consists of 10 frames. Each frame included in moving picture will be displayed for the corresponding running time of the field of variable delay.

The field of the number of layers shows the number of layers used for forming a frame of moving picture and it consists of one byte. By controlling the order of layers, the layout of images in a frame is controllable.

Repeat flag consists of one bit and it shows whether moving picture will be repeatedly displayed or not. For example, moving picture is repeatedly displayed on if repeat flag is set to "0".

The field of color palette consists of one bit and it shows whether 256 color palette is used or not.

The field of better compression consists of one bit and it shows which one between compression ratio and compression speed is emphasized to compress moving picture. If it is set to "0", it shows compression ratio is emphasized to compress moving picture. On the contrary, if it is set to "1", it shows compression speed is emphasize.

The field of gray palette consists of one bit and it shows whether 256 gray palette is used or not.

The field of palette compression consists of one bit and it shows whether the palette used is compressed or not.

The field of palette size has meaning only if the field of color palette is set to "1" and the field of gray palette is set to "0" and it shows the size of palette data.

The field of palette data has meaning only if the field of color palette is set to "1" and the field of gray palette is set to "0" and it stores palette data.

The field of level of image consists of one byte and it shows that which format is adapted to express image among black/white, 4 gray, 256 color and uncompressed 256 color.

The field of compression method consists of one byte and it shows the compression method to form moving picture. There are several compression methods like Hoffman coding, W-coding and Arithmetic coding, etc.

The field of the number of image consists of one byte and it shows the number of total images included in moving picture.

Also, moving picture data includes frame header, movement data, and picture type data part.

FIG. 8 shows frame header structure according to the present invention. Frame header defines the way how each frame is included in moving picture. As shown in FIG. 8, frame header consists of several fields including "inversion or not", "used in reduced", "using background color" and "the number of movement data".

The field of "inversion or not" indicates whether frame is included to moving picture with inversion or not.

The field of "used in reduced" shows whether frame is used for representative frame or not. If this field is set to "0", frame is not representative frame. And if this field is set to "1", frame is representative frame.

The field of "using background color" shows whether frame has its own background color or not.

The field of "the number of movement data" shows how many effects are added to image before each image is arranged into frame. To effectively arrange image into frame, image can be rotated, magnified or turned rear side front. For example, the number of movement data becomes "3" if image is magnified and rotated before being arranged into frame.

FIG. 9 shows movement data structure. Movement data is fields showing the kind of effects added to each image and location of each image in frame. Movement data consists of "image ID", "layer", "reversion", "rotation", "magnification", "scaling algorithm", "horizontal offset", "vertical offset" and "scale factor".

The field of "image ID" indicates the identification of image to display in frame.

The field of "layer" shows the order of layer. Therefore, the arrangement order between images could be defined by this field.

The field of "reversion" shows whether picture is reversed on horizontal or vertical axis of each frame on the screen of mobile phone, when picture is reversed.

The field of "rotation" shows count clockwise rotation angle of image.

The field of "magnification" shows whether picture is magnified or not. And the field of "scaling algorithm" indicates the kind of algorithm of magnifying.

The field of "horizontal offset" and "vertical offset" shows the horizontal and vertical distances spaced away from an upper-left corner of frame, respectively.

The field of "scale factor" shows the amount of magnification.

Moving data and frame header may be defined as frame header because they shows that picture type comprises frame.

FIG. 10 shows construction of picture type header. Picture type header is comprised of compression recognition field which shows compression of picture, ID field of the picture, transition field which shows transition of picture, recognition of picture transition field, transparency color type field which shows shape of picture at the frame, recognition of picture division field which shows recognition of division of picture and transparency color field.

The explanation of compression field is the followings. Picture type data are compressed according to various compression ways, and sometimes amount of compressed data are increased compared to before compression. This case may be explained using Hoffman's coding as the followings. According to the Hoffman's coding data may be compressed according to variation of data "0 & 1" in table 2. As shown in table 2, if only one of "0 & 1" is repeated continuously compression rate is increased and data rate is decreased, but if "0 & 1" is repeated each other data rate may be increased. Compression recognition field shows whether data rate is decreased.

TABLE 2

| Run Length | White(zero) bit | black(one) bit |
|---|---|---|
| 0 | 0000110111: Block End | |
| 1 | 000111 | 010 |
| 2 | 0111 | 11 |
| 3 | 1000 | 10 |
| 4 | 1011 | 011 |
| 5 | 1100 | 0011 |
| 6 | 1110 | 0010 |
| 7 | 1111 | 00011 |
| 8 | 10011 | 000101 |
| 9 | 10100 | 000100 |
| 10 | 00111 | 0000100 |
| 11 | 01000 | 0000101 |
| 12 | 001000 | 0000111 |
| 13 | 000011 | 00000001 |
| 14 | 110100 | 00000111 |
| 15 | 110101 | 0000011000 |
| 16 | 101010 | 0000010111 |
| 17 | 101011 | 0000001000 |
| 18 | 0100111 | 00001100111 |
| 19 | 0001100 | 00001101000 |
| 20 | 0001000 | 00001101100 |
| 21 | 0010111 | 00001101110 |
| 22 | 0000011 | 00000110111 |
| 23 | 0000100 | 00000101000 |
| 24 | 0101000 | 00000010111 |
| 25 | 0101011 | 00000011000 |
| 26 | 0010011 | 000011001010 |
| 27 | 0100100 | 000011001011 |
| 28 | 0011000 | 000011001100 |
| 29 | 00000010 | 000011001101 |
| 30 | 00000011 | 000001101000 |
| 31 | 00011010 | 000001101001 |
| 32 | 00011011 | 000001101010 |
| 33 | 00010010 | 000001101011 |
| 34 | 00010011 | 000011010010 |
| 35 | 00010100 | 000011010011 |
| 36 | 00010101 | 000011010100 |
| 37 | 00010110 | 000011010101 |
| 38 | 00010111 | 000011010110 |
| 39 | 00101000 | 000011010111 |
| 40 | 00101001 | 000011001100 |
| 41 | 00101010 | 000001101101 |
| 42 | 00101011 | 000011011010 |
| 43 | 00101100 | 000011011011 |
| 44 | 00101101 | 000001010100 |
| 45 | 00000100 | 000001010101 |
| 46 | 00000101 | 000001010110 |
| 47 | 00001010 | 000001010111 |
| 48 | 00001011 | 000001100100 |
| 49 | 01010010 | 000001100101 |
| 50 | 01010011 | 000001010010 |
| 51 | 01010100 | 000001010011 |
| 52 | 01010101 | 000000100100 |
| 53 | 00100100 | 000000110111 |
| 54 | 00100101 | 000000111000 |
| 55 | 01011000 | 000000100111 |
| 56 | 01011001 | 000000101000 |
| 57 | 01011010 | 000001011000 |
| 58 | 01011011 | 000001011001 |
| 59 | 01001010 | 000000101011 |
| 60 | 01001011 | 000000101100 |
| 61 | 00110010 | 000001011010 |

TABLE 2-continued

| Run Length | White(zero) bit | black(one) bit |
|---|---|---|
| 62 | 00110011 | 000001100110 |
| 63 | 00110100 | 000001100111 |
| 64 | 11011 | 000001111 |

ID field, each picture which comprises moving picture is granted different ID, and same picture data do not need to be transmitted every time but frame with the same ID can comprise same pictures.

In transition type field, picture type can be recognized whether it is basic type or transition picture type.

In transparency color type field, colors of the picture type are designated as shown in FIG. 11 when picture type is compounded with other picture type in frame. Opening in circle shape is in FIG. 11(a). When opening part of picture type and background color are compounded in frame which has different background color, background color and color of opening may be expressed with same color of background color of frame as shown in FIG. 11(b). Background color may be the same as that of frame and color of opening may be expressed as the same as that of original picture as shown in FIG. 11(c). Moreover, all colors of picture may be colored on background color in the frame. Background color may be transparency color. It is defined as edge detection that inner shape of circle shaped picture type is recognized. According to this definition, FIG. 11(b) shows that it does not use transparency color but edge detection. FIG. 11(c) shows that it does not use transparency color and edge detection. FIG. 11(d) shows that it uses transparency color.

Division check field is that it check whether picture type data are divided and transmitted. It shows that divided data are transmitted in case picture type data rate is high.

Moreover, picture type data in FIG. 7 comprise moving picture, and have data on essential picture type such as color, size, shape of picture type and so on. When one picture type is repeatedly displayed in moving picture, picture type data are not repeatedly transmitted but all picture type data comprising moving picture are transmitted one time. When picture type is displayed in moving picture, picture type ID is used, and picture type is grasped and displayed in frame. And if moving picture is black and white, it may be transmitted different from construction of FIG. 7.

Figure 12:
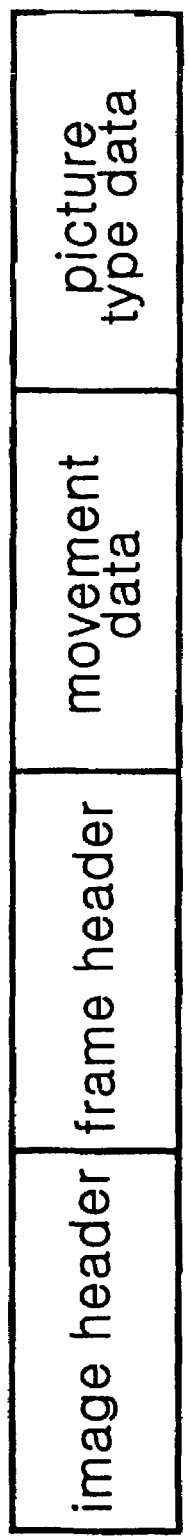
FIG. 12 shows structure of black and white moving picture.

FIG. 12 shows data structure of black and white moving picture data. As show in FIG. 12, black and white data are comprised of image header which includes image identifier and compression check field, frame header which includes frame number field showing total number of frame comprising black and white moving picture, picture type number field showing number of picture type comprising moving picture, block number bit rate field and compression method code showing compression method used for transmitted moving picture, moving data which shows form of each picture type comprising moving picture in frame, and picture type data field, each picture type comprising moving picture.

As shown in table 3, image identifier and compression check field show that transmitted data from outer space are black and white moving picture and if moving picture data are compressed.

TABLE 3

| No. | Field | Description |
|---|---|---|
| | Image header | |
| 1 | Image Identifier | Identifier showing this image is S.I.S. type |
| 2 | flag showing compression | flag showing whether this picture is compressed or not |
| | Frame header | |
| 3 | The number of frames | |
| 4 | The number of images | |
| 5 | The number of bits to indicate block number | |
| 6 | The compression type | |
| | Movement data | |
| 7 | showing image no. included in frame | showing image numbers included in frame |
| 8 | showing layout of each image in frame | showing vertical offset, horizontal offset, etc of each image when it is arranged into frame |
| 9 | transition block | showing whether transition block is used or not |
| 10 | transition block data | corresponding transition block data if transition block is used |
| | Picture type data | |
| 12 | The number of horizontal block | the number of horizontal blocks of image |
| 13 | The number of vertical block | the number of vertical blocks of image |
| 14 | block encoding status | |
| 15 | block data | |

Frame number field shows total number of frames which comprise moving picture.

Picture type number field shows number of picture type comprising moving picture. If one of picture types comprising moving picture is shown five times in entire moving picture and other picture type is shown six times, picture type number field is filled with 10. The reason that 10 is filled instead of 11 is that, counting number from 0, in case of 1, 0 is filled and in case of 2 1 is filled.

Block number bit rate field shows block number of the biggest picture type among picture type comprising moving picture.

Compression method field shows compression method used among several method for compressing moving picture data.

Moving data are constructed the same as value of total frame number field comprising moving picture and show state of expression in frame. Moving data field includes picture type inclusion check field, picture type variant file field, transition block existence field and transition block field.

Picture type inclusion check field decides whether picture or text type file may be expressed in frame. It is necessary that bit number of field is almost the same as that of picture type number field of header field. And in from left to right bit order, bit value "1" indicates that the picture type file is expressed in frame, and bit value "0" indicates that the picture type file is not expressed in frame. For example, if number of type is 5 in subsequent head field, type inclusion check key code is comprised of 5 bits.

Type inclusion check key code in first variation file is "10010", it means that type 1 & 4 is expressed included but type 2, 3 & 5 are not expressed in first frame. It means sound. Thus, subsequent type variation file code shows in what way type file 1 is included in first frame. If five picture types are expressed in frame, picture type variation file is comprised of five type variation file fields. Five type variation file fields include horizontal and vertical location variation fields which show location of picture type, horizontal inversion check field and vertical inversion check field which show if picture type is inversed, and magnification check field which shows if picture type is magnified or reduced.

Moreover, transition block existing check field is 1 bit code and shows if transition block is existing in subsequent picture type variation field If it is "1" transition block is inserted and if it is "0" transition block is not there and transition block check field ends up located at the end of picture type field. Transition block field is reserved field to be used in case of changing several block value comprising frame, after frame is completed with above described type file formed. And transition block field may exist selectively whether preceding transition block field exists and a plurality of transition block field may exist.

Picture type data field includes information on picture type comprising moving picture. It is comprised of horizontal block field, vertical block field, block encoding state field, and block data each of which becomes one-dimensionally bit streamed and transmitted after picture type data are divided into block.

Picture type is classified into basic picture type and transition picture type. In case of basic picture type, number of horizontal block and vertical block, randomly determined, is encoded in horizontal block field number and vertical block number field. Total bit number of block encoding state field is the same as that of transition picture type file, that is, (horizontal block number)×(vertical block number). Each bit shows whether subsequent block data are compressed by several compression methods. For example, on the assumption that "n" is random number less than total number of blocks, if "n" th bit is "1", it indicates that "n" th block is compressed, if "n" th bit is "0", it indicates that "n" th block is not compressed. Block data compares compressed data and uncompressed data, and selects one with less data rate, and have each block one dimensional bit-streamed and transmitted.

And if picture type is transition picture type, different part of picture type which is different from the basic picture type and recognized as transition type. And transition block is comprised of block number field which possesses data on recognized transition block numbers and transition block end field which shows end of transition block and comprised of "1" and its length is the same as that designated in bit number of block number code. Transition block is also transmitted in the form of one dimensional bit stream for each block.

Figure 13:
FIG. 13 illustrates the process that basic picture type data comprising black and white moving picture are one dimensionally bit-streamed according to the present invention of method for transmitting moving picture via telecommunication.

FIG. 13 illustrates the process that basic picture type data comprising black and white moving picture are one dimensionally bit-streamed according to the present invention of method for transmitting moving picture via telecommunication.

As shown in FIG. 13, picture type is randomly divided into a plurality of blocks and each block is transmitted. FIG. 13 shows that one of blocks is comprised of 64 bits. Data value of each block may be one dimensionally bit streamed in zigzag way and other way.

Figure 14:
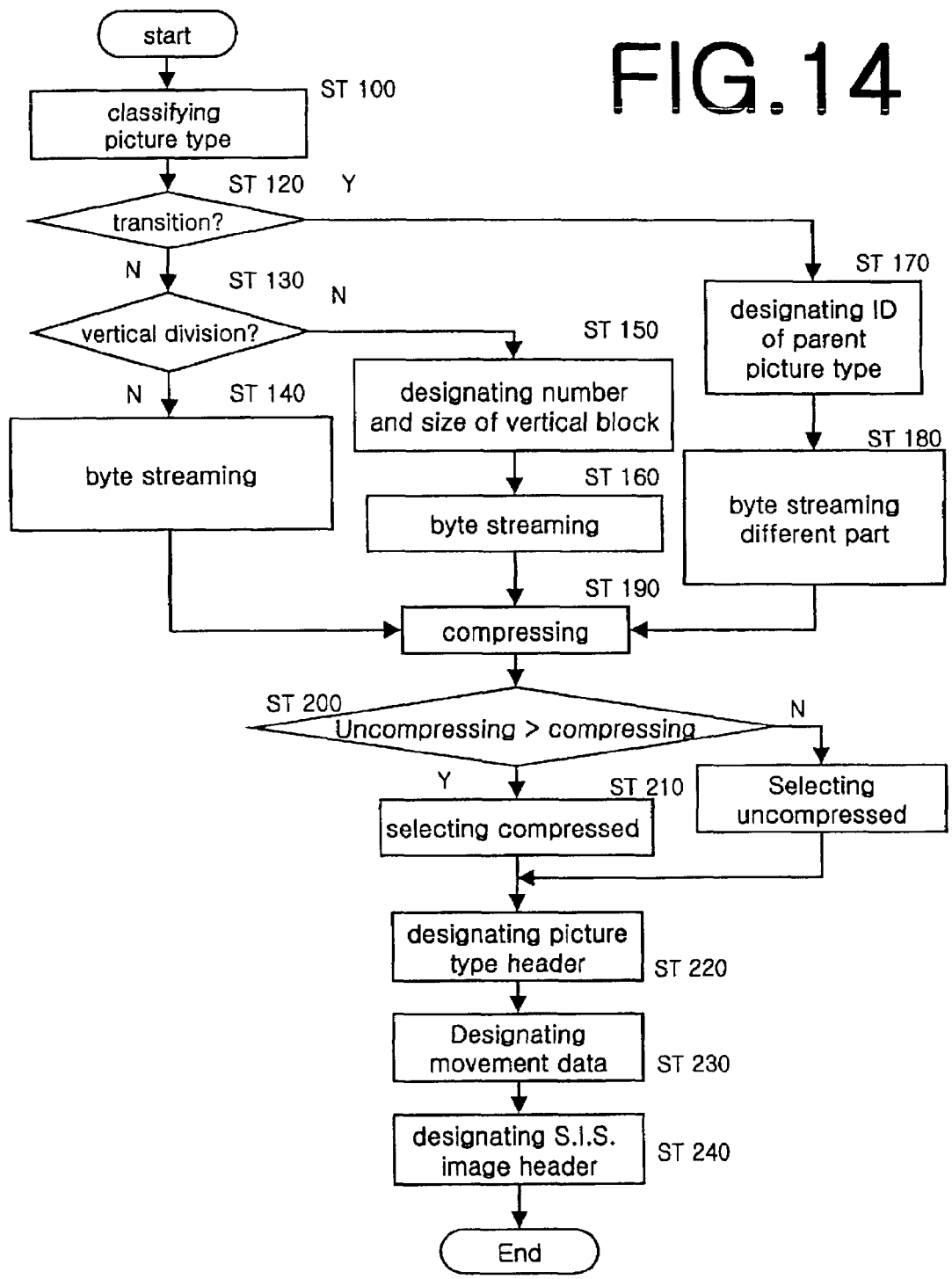
FIG. 14 shows flowchart of encoding each picture type data comprising moving picture according to the present invention of method for transmitting moving picture via telecommunication.

FIG. 14 shows flowchart of encoding each picture type data comprising moving picture according to the present invention of method for transmitting moving picture via telecommunication.

Step 1 (ST 100): classifying all picture type comprising moving picture. Picture types comprising moving picture are basic picture type and transition picture type. Basic picture type which is basic for transition picture type may be defined as parent picture type of transition picture type. Each classified picture type is granted ID. ID is recognized as essential number of picture type. When ID is expressed in each frame comprising moving picture, picture type may be expressed in frame using only ID.

Step 2 (ST 120): Differentiate basic picture type from transition picture type.

Step 3 (ST 130): Deciding if basic picture type is divided vertically in case picture type is basic picture type. When picture type is transmitted as a moving picture and displayed on the screen, large amount of picture type data rate may not sense call signal to mobile phone during decoding of picture type. Accordingly, the purpose of vertical division is that a part of picture type is displayed and call stand by state may be checked repetitively. But during the encoding process only vertical block division is demonstrated and during decoding process picture type which is divided vertically may be displayed on the screen. Moreover, in case picture type is transition picture type, because difference between parent picture type and transition picture type is transmitted, vertical division may not be necessary.

Step 4 (ST 140): Byte streaming one dimensionally picture type data which are not vertically divided.

Step 5 (ST 150): Designating vertical block number of basic picture type and each block size after vertical block division of basic picture type.

Step 6 (ST 160): Byte streaming one dimensionally picture type which is vertically divided in block.

Step 7 (ST 170): Designating ID of parent picture type of transition picture type after picture type is classified as transition picture type. Difference between transition picture type and parent picture type is grasped and beginning block value and ending block value are designated in the difference. Where values of blocks are identical with each other is recognized as "Part".

Step 8 (ST 180): Byte streaming one dimensionally different part between transition picture type and parent picture type.

Step 9 (ST 190): Compressing picture type data which are byte streamed. Methods for compression are Hoffman coding, arithmatic coding and W-coding.

Step 10 (ST 200): Comparing compressed data rate and uncompressed data rate in picture type.

Step 11 (ST 210): Selecting picture type data which have less data rates.

Step 12 (ST 220): Designating picture type header in selected picture type.

Step 13 (ST 230): Designating moving data which have data on which picture type is expressed in frame.

Step 14 (ST 240): Designating "S.I.S" image header expressing that picture type is moving picture.

Figure 15:
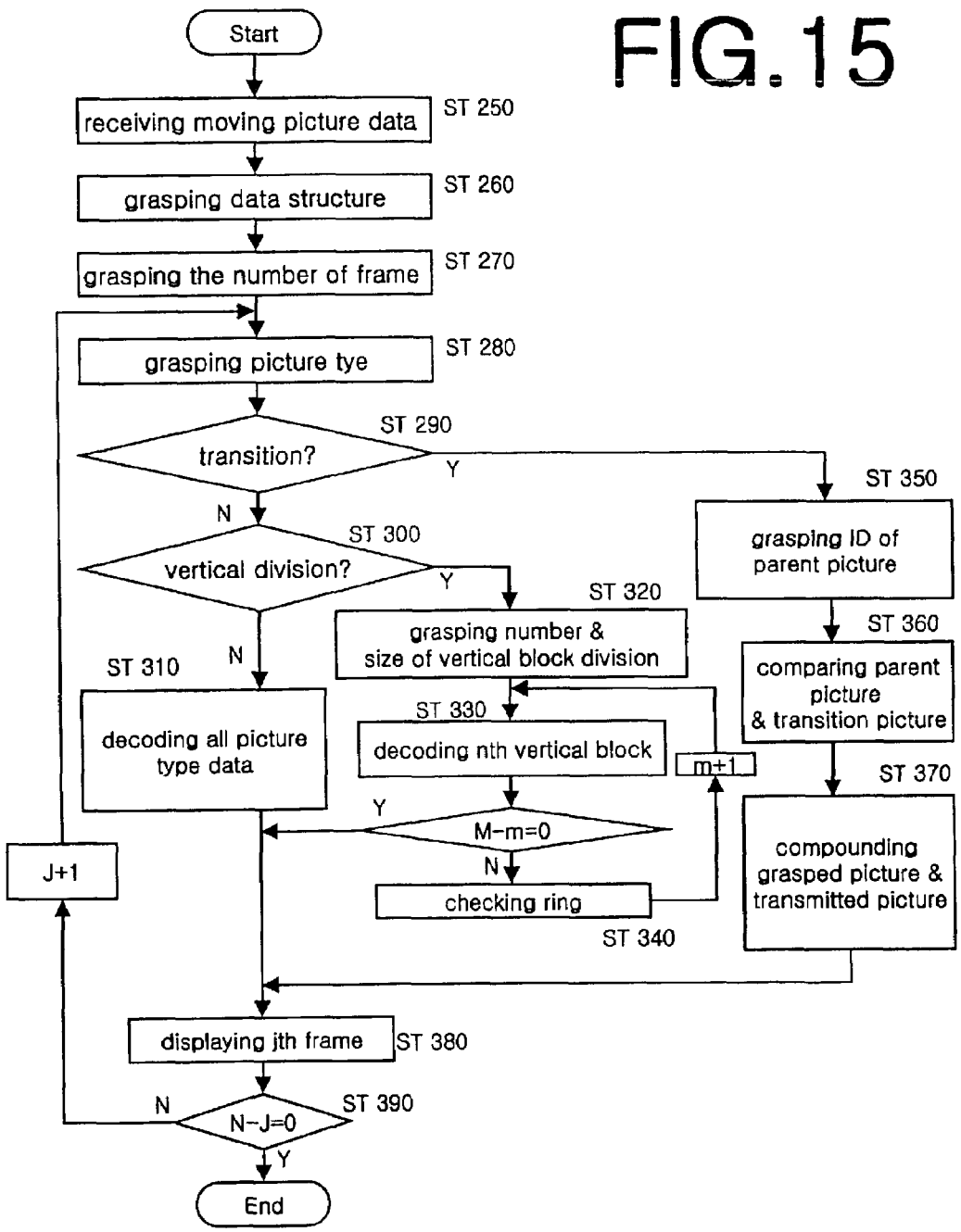
FIG. 15 shows flowchart of one embodiment for decoding encoded moving picture data according to the present invention of method for transmitting moving picture via telecommunication.

FIG. 15 shows flowchart of one embodiment for decoding encoded moving picture data according to the present invention of method for transmitting moving picture via telecommunication.

Step 1 (ST 250): Receiving moving picture data with "S.I.S." image header showing that data received on mobile phone are moving picture.

Step 2 (ST 260): Grasping data structure of received moving picture.

Step 3 (ST 270): Designating number in order of transmitted frame after number of frame is grasped.

Step 4 (ST 280): Grasping picture type in first frame.

Step 5 (ST 290): Grasping whether picture type in frame is from basic picture type or transition picture type.

Step 6 (ST 300): Grasping whether vertical division block is designated in picture type file among picture types in frame.

Step 7 (ST 310): Decoding all picture type data if picture type is not designated in vertical block division.

Step 8 (ST 320): Grasping number and size of designated vertical block by picture type in which vertical block division is not designated. "M" is defined as total number of vertical block of picture type and "m" is defined as number of vertical block which is decoded.

Step 9 (ST 330): Decoding first vertical block after number of vertical block "m" is initialized.

Step 10 (ST 340): Subtracting number of vertical block "m" from total number of vertical block "M". if result is not "0", "1" is added to "m" after call stand-by is checked. "m"th vertical block is decoded and calculate result of (M−m) until the result is 0.

Step 11 (ST 350): Grasping ID of parent picture type to transition picture type in transmitted part of transition picture type.

Step 12 (ST 360): Grasping which basic picture type transition picture type is from by using parent picture type ID.

Step 13 (ST 370): Decoding picture type after picture type is completed by compounding grasped picture type and transition picture type. If grasped picture type designates vertical block, above ST 320 to ST 340 is repeatedly processed.

Step 14 (ST 380): Displaying decoded frame on the screen of mobile phone terminal after decoding of picture type of one frame is completed.

Step 15 (ST 390): Processing repeatedly until all frame of moving picture are displayed on the screen.

Figure 16:
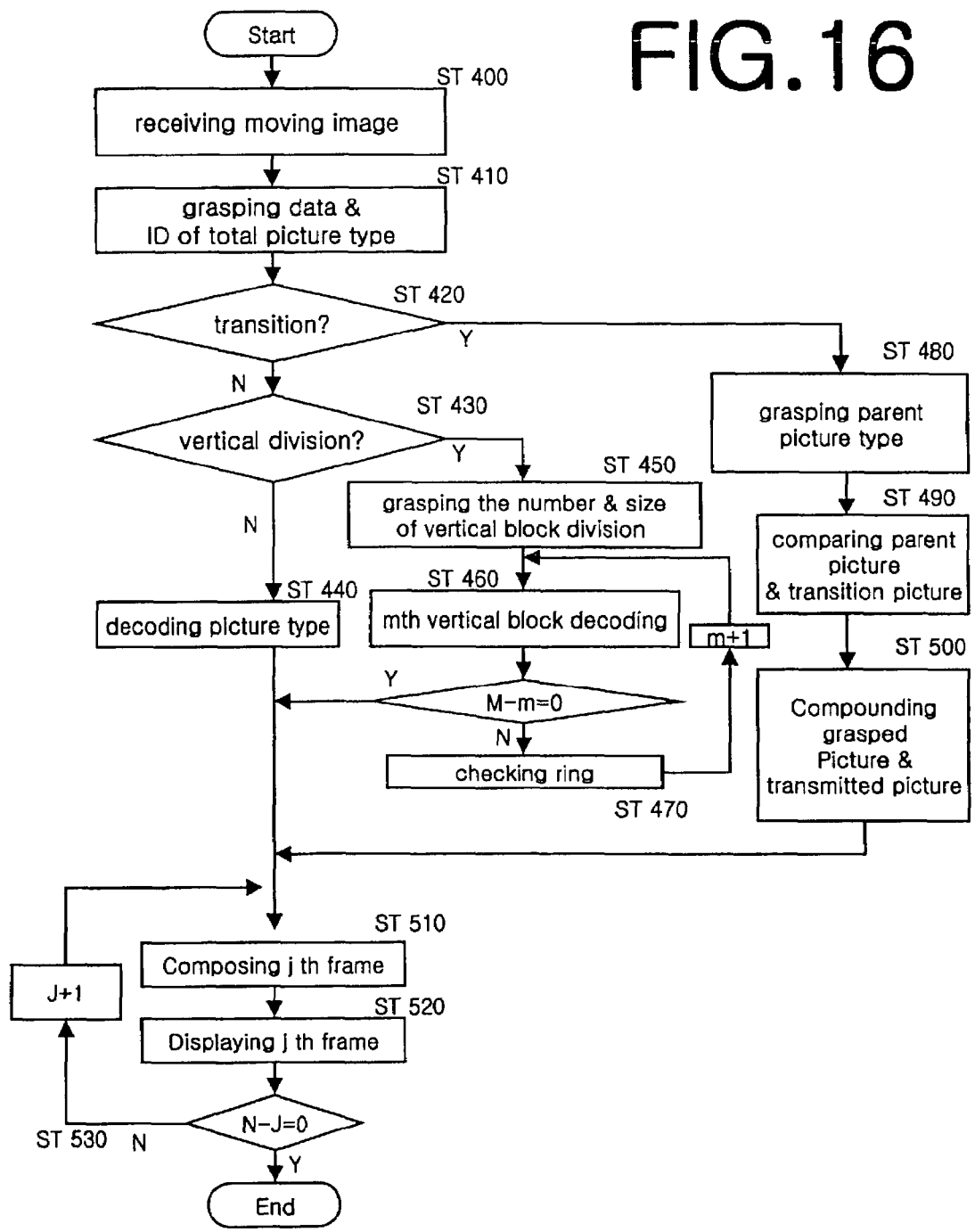
FIG. 16 shows flowchart of other embodiment for decoding encoded moving picture data according to the present invention of method for transmitting moving picture via telecommunication.

FIG. 16 shows flowchart of other embodiment for decoding encoded moving picture data according to the present invention of method for transmitting moving picture via telecommunication.

Step 1 (ST 400): Receiving moving picture data with "S.I.S." image header showing that data received on mobile phone are moving picture.

Step 2 (ST 410): Grasping data & ID of total picture type.

Step 3 (ST 420): Grasping whether picture type in frame is transmitted from basic picture type or transition picture type.

Step 4 (ST 430): Grasping whether vertical division block is designated in picture type file among picture types in frame.

Step 5 (ST 440): Decoding all picture type data if picture type is not designated in vertical block division.

Step 6 (ST 450): Grasping number and size of designated vertical block by picture type in which vertical block division is not designated. "M" is defined as total number of vertical block of picture type and "m" is defined as number of vertical block which is decoded.

Step 7 (ST 460): Decoding first vertical block after number of vertical block "m" is initialized as "1".

Step 8 (ST 470): Subtracting number of vertical block "m" from total number of vertical block "M". if result is not "0", "1" is added to "m" after call stand-by is checked. "m"th vertical block is decoded and calculate result of (M−m) until the result is 0.

Step 9 (ST 480): Grasping ID of parent picture type to transition picture type in transmitted part of transition picture type.

Step 10 (ST 490): Grasping which basic picture type transition picture type is from by using parent picture type ID.

Step 11 (ST 500): Decoding picture type after picture type is completed by compounding grasped picture type and transition picture type. If grasped picture type designates vertical block, above ST 450 to ST 470 is repeatedly processed.

Step 12 (ST 510): Completing frame comprising moving picture by using decoded picture type. "N" is defined as total number of frame comprising moving picture, and completed frame number is grasped and "J" is defined as frame number completed at present. The number of frame which is completed first is defined as "1".

Step 13 (ST 520): Displaying decoded frame on the screen of mobile phone terminal after decoding of picture type of one frame is completed.

Step 14 (ST 530): Subtracting "m" from "M". if result is "0" it means that every frame is displayed, otherwise, value of "J" is increased by "1" and subtraction is repeated until the result is "0".

Figure 17:
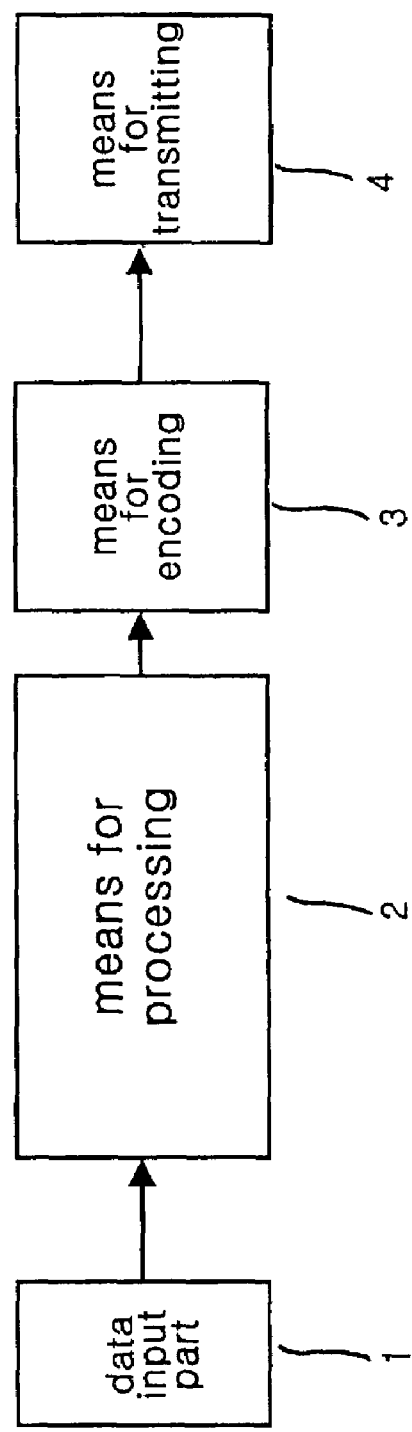
FIG. 17 shows schematic block diagram illustrating concept of system for encoding moving picture according to the present invention of method for transmitting moving picture via telecommunication.

FIG. 17 shows schematic block diagram illustrating concept of system for encoding moving picture according to the present invention of method for transmitting moving picture via telecommunication.

Moving picture transmitting system is comprised of means for inputting moving picture data (1), processor for processing input data (2), means for encoding processed data (3), and means for transmitting out encoded data (4).

Means for inputting data (1) receives picture type data comprising moving picture data to be transmitted and receives user's selective items. Picture type data and user's selective items to be input in means for inputting data (1) encodes input data by order of process into transmitting format in FIG. 7. Means for encoding and processor are illustrated as an independent component in FIG. 7, but they may be easily designed into one component by using hardware or software methods. Encoded moving picture data may be transmitted out by transmission means on telecommunication network.

Figure 18:
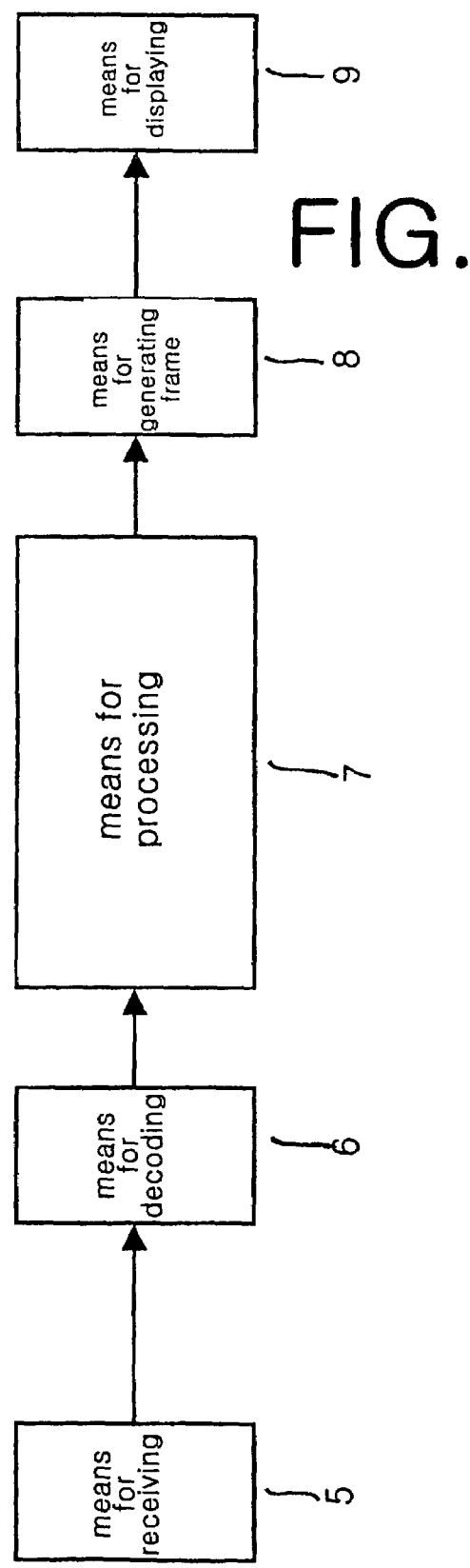
FIG. 18 shows schematic block diagram illustrating concept of system for decoding moving picture according to the present invention of method for transmitting moving picture via telecommunication.

FIG. 18 shows schematic block diagram illustrating concept of system for decoding moving picture according to the present invention of method for transmitting moving picture via telecommunication.

Moving picture receiving system according to the present invention is comprised of means for receiving data to be transmitted out (5), means for decoding received data (6), processor for processing decoded data (7), means for generating frame by using processed data (8), and means for displaying generated frames (9).

Moving picture data received to means for receiving (5) by using telecommunication are encoded date shown in FIG. 7. Received encoded data are decoded by order of means for decoding (6) and processor (7) and comprise frames of means for generating frame (8) by control signal of processor. The frames are displayed by means for displaying (9).

Means for decoding (6) processor (7) and means for generating frames are illustrated separately in fig. But they may be easily designed as one component using general hardware or software methods.

Figure 19:
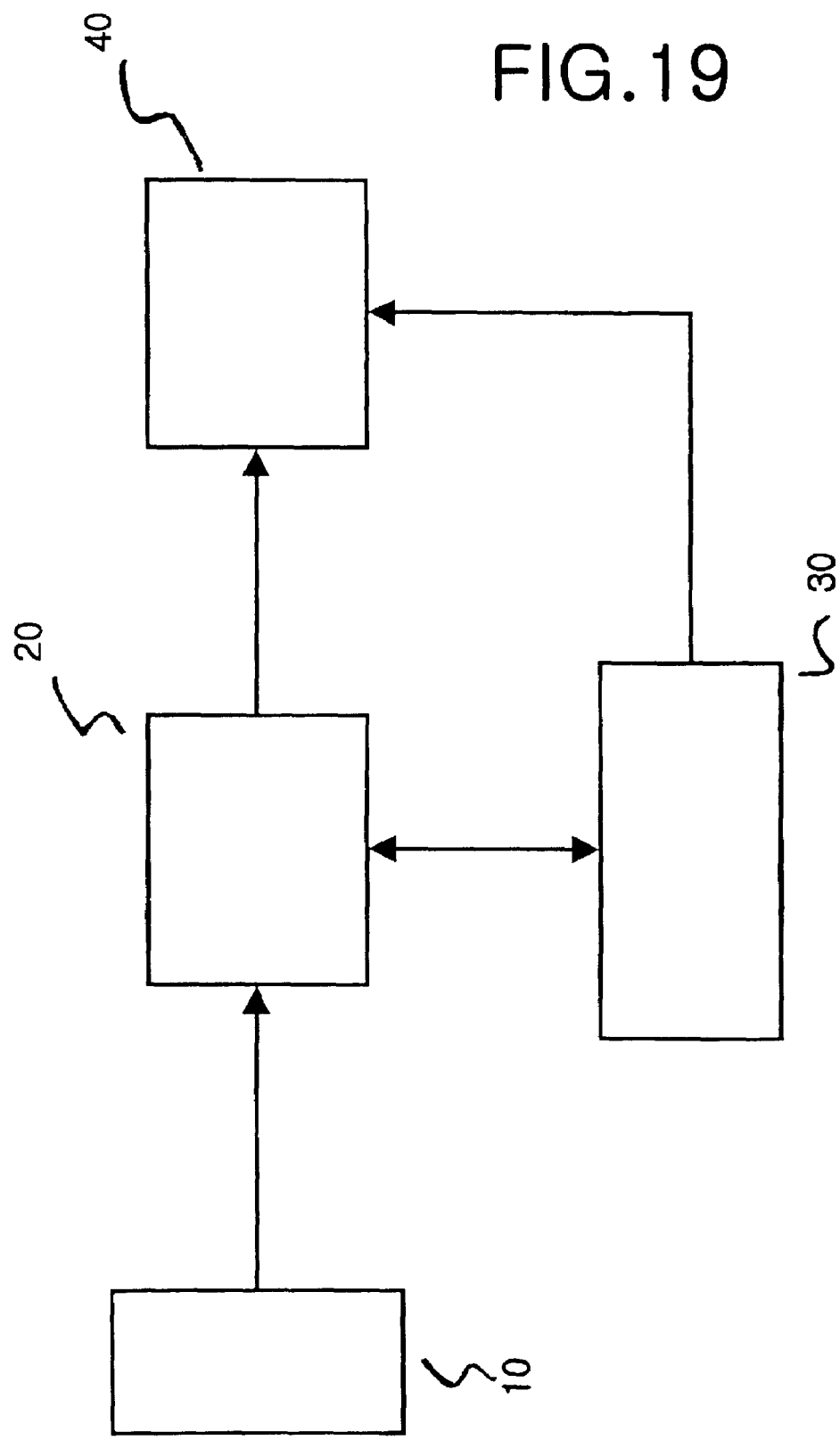
FIG. 19 shows structure of contents server which encodes moving picture according to the present invention of method for transmitting moving picture via telecommunication.

FIG. 19 shows structure of contents server which encodes moving picture according to the present invention of method for transmitting moving picture via telecommunication.

Contents server is comprised of data receiving unit (10) for receiving data such as mobile phone specification for expressing moving picture and user information, data storing unit (30) for writing and storing algorithm encoding moving picture, central processing unit (20) for processing encoding by using algorithm, transmitting unit (40) for transmitting encoded data.

Data receiving unit (10) receives transmitted data from "HLR".

Data storing unit (30) is comprised of RAM for storing received data from data receiving unit, ROM for storing encoded algorithm and RAM for storing encoded data from central processing unit (20).

Central processing unit (20) encodes data by using data and algorithm in data storing unit and stores the encoded data in data storing unit (30). And if transmits encoded data from data transmitting unit.

Data transmitting unit (40) transmits encoded data encoded in central processing unit and stored in data storing unit by order of central processing unit.

Figure 20:
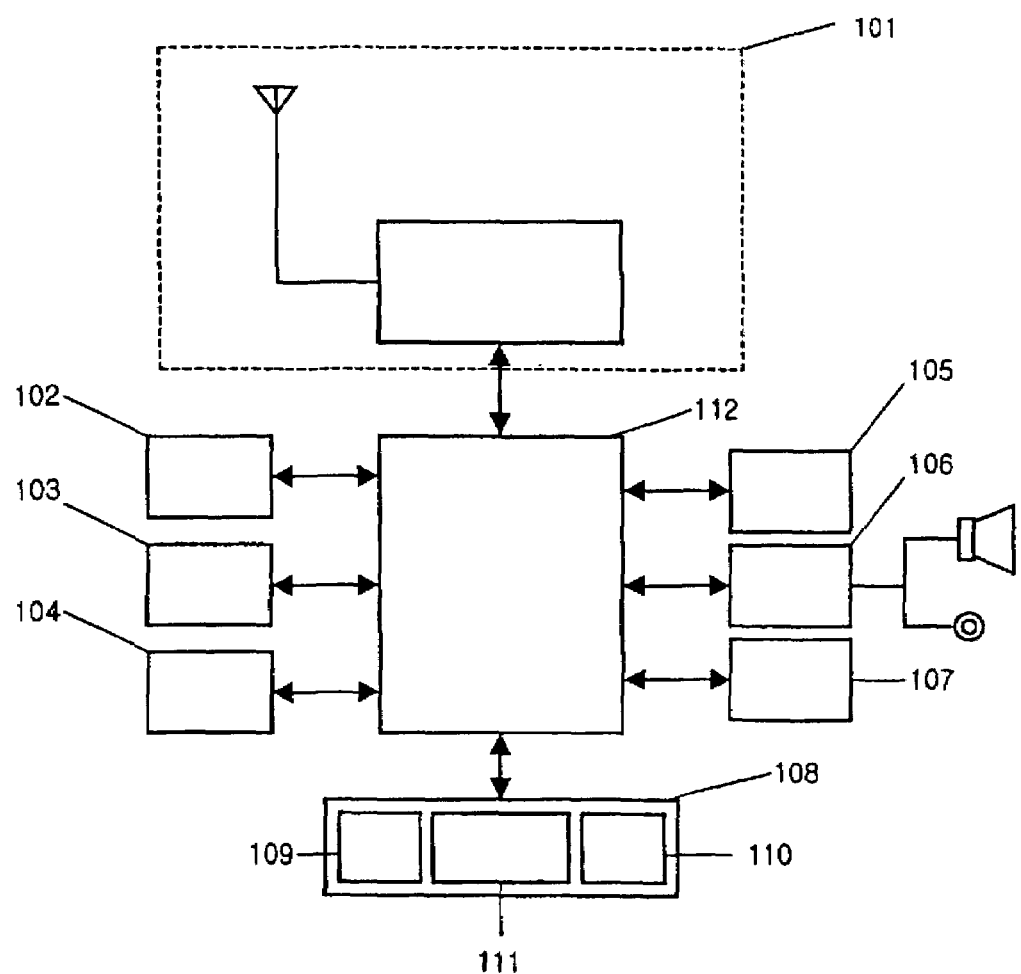
FIG. 20 shows structure of mobile station which decodes and expresses moving picture according to the present invention of method for transmitting moving picture via telecommunication.

FIG. 20 shows structure of mobile station which decodes and expresses moving picture according to the present invention of method for transmitting moving picture via telecommunication.

Mobile station is comprised of data receiving unit (101) for receiving encoded data, clock generator (102), area connecting unit (103), power supply unit (104) for supplying power to terminal, data input unit (105) for inputting data to mobile station by user, encoding/decoding unit (106) for digitalizing sound signal and/or transforms digital signal for user to be recognized, displaying unit (107) for displaying picture or text, storing unit (108) for storing algorithm for decoding, received encoded data & decoded data, and central processing unit for processing decoding by using algorithm.

Data receiving unit (101) includes antenna and RF transceiver which receives encoded data.

Storing unit (108) includes ROM (109) for storing algorithm for decoding and decompressing and send to central processing unit (112), RAM for providing space for decoding and decompressing data received from data receiving unit, and fresh memory for storing decoded data.

Displaying unit (107) expresses decoded and decompressed data stored in data storing unit (108). Displaying unit (107) has size of 256 pixels horizontally and vertically to fully display data, and may display color in case the data includes colors.

Central processing unit (112) processes a series of performance to display moving picture and includes at least one IC chip.

Completed moving picture may be transmitted from message center to each mobile phones by using WAP, expanded SMS, MMS (muti-media messaging system) and so on. Method for transmitting moving picture data by using expanded SMS as an embodiment is explained below.

According to the present invention of method for transmitting moving picture via telecommunication A method for transmitting the image data using the expanded SMS will be described hereinafter.

According to TIA/EIA-637-A standard defining the SMS service in the CDMA system, the protocol for the SMS transmission has three layer structures, i.e., a relay layer, a transport layer, and a teleservice layer.

The relay layer is the lowest grade and the teleservice layer is the highest grade.

Parameters of the relay layer are identical to those used in the conventional SMS message transmission method. Parameters of the transport and teleservice layers are newly defined.

The message of the transport layer can be classified into a point-to-point message, a broadcast message, and an acknowledge message. Since the purpose of the present invention is to transmit the image data to a specific user, the point-to-point message is used.

The transport layer defined in the IS-637A standard is shown in the following Table.

TABLE 4

| Parameter | Type |
|---|---|
| Teleservice Identifier | Mandatory |
| Originating Address | Mandatory |
| Originating Subaddress | Optional |
| Destination Address | Mandatory |
| Destination Subaddress | Optional |
| Bearer Reply Option | Optional |
| Bearer Data | Optional |

In Table 4, the teleservice identifier indicates a type of message transmitted from the SMS. There are five types of the teleservice identifier, which can be supported by TIA/EIA-637A standard, as shown in the following Table 3.

TABLE 5 teleservice identifier

| TIA/EIA-637-A TELESERVICE | TIA/EIA-41 | Value |
|---|---|---|
| IS-91 Extended Protocol Enhanced Services | CMT-91 | 4096 |
|  | CPT-95 | 4097 |
| Wireless Messaging Teleservice | CMT-95 | 4098 |
| Voice Mail Notification | VMN-95 | 4099 |
| Wireless Application Protocol | WAP |  |

More detailed values of the teleservice identifiers are defined in TIA/EIA-41-D standard. It is provided it the standard that the service company can optionally select the value between 49152–65535.

Accordingly, when selecting and using any number between 49152–65535, which is not used by the current service company, it is possible to transmit the image data using the SMS.

Other parameters of the transport layer are identical to those used in the conventional SMS message transmission. However, a bearer data section is provided to contains information on the teleservice layer, which is the higher grade.

As shown in Table 5, the bearer data section is formed by adding subparameters of a SMS deliver message of the teleservice layer and new fields of the last image information.

TABLE 6

SMS Deliver Message Subparameter

| Subparameter | Type | Subparameter ID/Remark |
|---|---|---|
| Message Identifier | Mandatory | 0 |
| User Data | Mandatory | 1 |
| Message Center Time Stamp | Optional | 3 |

TABLE 6-continued

SMS Deliver Message Subparameter

| Subparameter | Type | Subparameter ID/Remark |
|---|---|---|
| Validity Period-Absolute | Optional | 4 |
| Validity Period-Relative | Optional | 5 |
| Reply Option | Optional | 10 |
| Alert Message Delivery | Optional | 12 |
| Image Information | Mandatory | Any number unused in 16–255 |

In Table 6, the image information subparameter is selected between 16–55, which are provided as reserved values in TIA/EIA-637-A standard. Subparameters except for the user data field and the image information field are identical to those used in the conventional SMS message. The subparameters of the user data field and the image information field are respectively defined in the following tables 6 and 7.

TABLE 7

User Data Subparameter

| Fields | Length(Bits) | Value/Remark |
|---|---|---|
| SUBPARAMETER ID | 8 | 00000001 |
| SUBPARAM LEN | 8 | Variable |
| MSE ENCODING | 5 | Image encoding method |
| NUM FIELD | 8 | Length of CHARi |
| CHARi | 8× NUM FIELD | Real image data |
| Reserved | 3 | 000 |

TABLE 8

Image Information Subparameter

| Fields | Length(Bits) | Value/Remark |
|---|---|---|
| SUBPARAMETER ID | 8 | Any number unused in 16–255 |
| SUBPARAM LEN | 8 | 00000010 |
| IMAGE ID | 16 | Identify each image sent |
| MORE DATA | 1 | 0 or 1 |
| Reserved | 7 | 0000000 |

In Table 7, MSG_ENCODING is assigned with a specific number (0–31) which representing an encoding method of actual image data information contained in CHARi.

In Table 8, the image information subparameter includes fields having information with respect to an image data message, which is being transmitted.

That is, IMAGE_ID is the only field, which classifies the image, which is currently being transmitted, and MORE_DATA is the field indicating whether the data that is currently being transmitted is the end of the whole image data. If MORE_DATA is "1," this means that there is a following data, and if "0," this means that the data is the end of the whole image data.

Figure 21:
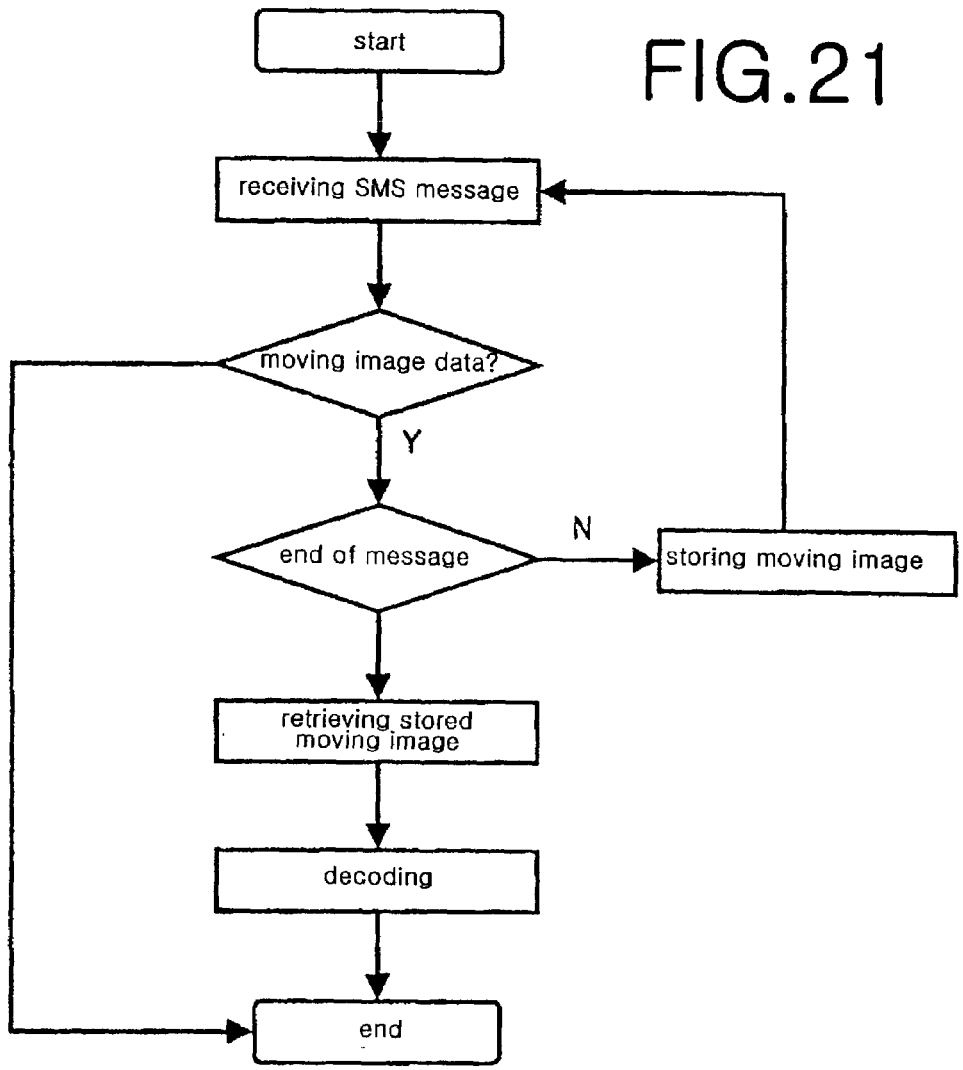
FIG. 21 shows flowchart for operation of mobile phone which receives expanded SMS message.

The operation of the mobile station that receives the above-described expanded SMS messages is realized with reference to the process depicted in FIG. 21. As shown in FIG. 21, when the SMS message is received, it is determined if the service identifier is the image data.

That is, it is determined if the service identifier is in the predetermined value range (49152–65535) which indicates the image data message. When service identifier is in the value range, i.e., is the image data, it is determined if the data which is currently being transmitted is the end of message through MORE-DATA field. When the data is the end of message, all of the received data is combined, then decoded. The decoded data is displayed in a waiting screen.

The moving picture transmitted by the SMS or other methods can be exclusively displayed on the waiting screen with full screen size or partially displayed on waiting screen with other system data(i.e. current time, date etc). For example, the transmitted moving picture is displayed on a half of the waiting screen and other system data (i.e. current time, date etc) is displayed on a rest of the waiting screen.

Whenever the user changes screen mode, the mobile station transmits the information of current screen mode to HLR in order to support above mentioned many ways of displaying. When Contents Server want to transmit the moving picture to mobile station, the contents server receives the information of current screen mode from HLR and forms a suitable moving picture for current screen mode and then transmits the formed moving picture to the mobile station.

In accordance with the above described present invention, moving picture data are constructed & compressed by use of specific algorithm and transmitted to mobile phone. And the moving picture is displayed on the standby-screen of mobile phone.

Moreover, moving picture data may be easily transmitted and received to mobile phones so moving picture may be displayed on the screen of mobile phone used at present before IMT-2000 service.

Additionally, moving picture data may be reconfigured to be fit into different specification of various mobile phones.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for receiving moving picture data via a data receiving unit, wherein the data includes at least one frame with at least one picture type, comprising:
   receiving encoded moving picture data, wherein the encoded moving picture data comprises at least one frame, wherein each frame comprises picture data; and
   for each frame in the encoded moving picture data:
      determining a picture type of the frame, wherein the picture type comprises one of a basic picture type and a transition picture type,
      if the picture type of the frame is the basic picture type, decoding the picture data for the frame;
      if the picture type of the frame is the transition picture type:
         determining an identifier of a parent frame,
         generating a modified frame based on the picture data for the frame,
         wherein the picture data for the frame comprises at least one difference between the picture data for the frame and the picture data for the parent frame, and
         decoding the picture data for the modified frame, and
      displaying the decoded picture data.

2. The method of claim 1 wherein decoding the picture data for the frame comprises:
   determining whether the picture data includes one or more divisions;
   if not, decoding all picture data for the frame; and
   if so, for each division, decoding the picture data corresponding to the division.

3. The method of claim 1, further comprising:
   storing the decoded picture data.

4. The method of claim 1 wherein the picture data comprises one or more of color picture data and black-and-white picture data.

5. The method of claim 1 wherein generating a modified frame comprises replacing at least a portion of the picture data for the parent frame with the picture data for the frame.

6. The method of claim 1 wherein generating a modified frame comprises replacing at least a portion of the picture data for the parent frame with a result of a function performed on the picture data for the parent frame and the picture data for the frame.

7. The method of claim 1 wherein the data receiving unit comprises a wireless data receiving unit.

8. The method of claim 1 wherein the data receiving unit comprises an interface for a wireless mobile station.

9. The method of claim 8 wherein the wireless mobile station comprises a mobile telephone.

10. A system for receiving moving picture data including at least one frame with at least one picture type, comprising:
    a processor;
    a processor-readable storage medium in communication with the processor;
    a data receiving unit in communication with the processor; and
    a display in communication with the processor,
    wherein the processor-readable storage medium contains one or more programming instructions for performing a method for receiving moving picture data, the method comprising:
       receiving encoded moving picture data via the data receiving unit, wherein the encoded moving picture data comprises at least one frame, wherein each frame comprises picture data; and
       for each frame in the encoded moving picture data:
          determining, via the processor, a picture type of the frame, wherein the picture type comprises one of a basic picture type and a transition picture type,
          if the picture type of the frame is the basic picture type, decoding the picture data for the frame;
          if the picture type of the frame is the transition picture type:
             determining an identifier of a parent frame,
             generating a modified frame based on the picture data for the frame, wherein the picture data for the frame comprises at least one difference between the picture data for the frame and the picture data for the parent frame, and
             decoding the picture data for the modified frame, and
          displaying, via the display, the decoded picture data.

11. The system of claim 10 wherein decoding the picture data for the frame comprises:
    determining whether the picture data includes one or more divisions;
    if not, decoding all picture data for the frame; and
    if so, for each division, decoding the picture data corresponding to the division.

12. The system of claim 10 wherein the processor-readable storage medium further contains one or more programming instructions for performing the following:
    storing the decoded picture data.

13. The system of claim 10 wherein generating a modified frame comprises replacing at least a portion of the picture data for the parent frame with the picture data for the frame.

14. The system of claim 10 wherein generating a modified frame comprises replacing at least a portion of the picture data for the parent frame with a result of a function performed on the picture data for the parent frame and the picture data for the frame.

15. A method for transmitting moving picture data via a data transmitting unit, wherein the data includes at least one frame with at least one picture type, comprising:
assigning a picture type to at least one frame, wherein the picture type comprises one of a basic picture type and a transition picture type, wherein each frame comprises picture data;
assigning an identifier to the frame based on the assigned picture type; and
for each frame:
if the frame is assigned a basic picture type, organizing all picture data for the frame as a byte stream,
if the frame is assigned a transition picture type:
assigning a frame identifier for a parent frame to the frame,
determining at least one difference between the picture data of the parent frame and the picture data of the frame, and
organizing the picture data pertaining to the difference as a byte stream; and
transmitting the byte stream for the at least one frame.

16. The method of claim 15 wherein transmitting the byte stream comprises:
compressing the byte stream;
determining a first data rate for the compressed byte stream;
determining a second data rate for the byte stream;
if the first data rate exceeds the second data rate, transmitting the compressed byte stream; and
if not, transmitting the byte stream.

17. The method of claim 16 wherein compressing the byte stream comprises performing one or more of a Hoffman coding algorithm, an arithmetic coding algorithm and a W-coding algorithm.

18. The method of claim 15, further comprising:
assigning header information to each frame, wherein the header information comprises one or more of data pertaining to the picture type of the frame, data pertaining to the frame, and data designating the frame as containing picture data.

19. The method of claim 15 wherein organizing all picture data for the frame comprises:
determining whether the picture data includes one or more divisions;
if the picture data includes one or more divisions:
for each division, organizing the picture data corresponding to the division as a division byte stream, and
organizing the division byte streams as a byte stream; and
if not, organizing all picture data for the frame as a byte stream.

20. A system for transmitting moving picture data, wherein the data includes at least one frame with at least one picture type, comprising:
a processor;
a processor-readable storage medium in communication with the processor; and
a data transmitting unit in communication with the processor,
wherein the processor-readable storage medium contains one or more programming instructions for performing a method of transmitting moving picture data, the method comprising:
assigning, via the processor, a picture type to at least one frame, wherein the picture type comprises one of a basic picture type and a transition picture type, wherein each frame comprises picture data;
assigning an identifier to the frame based on the assigned picture type; and
for each frame:
if the frame is assigned a basic picture type, organizing all picture data for the frame as a byte stream,
if the frame is assigned a transition picture type:
assigning a frame identifier for a parent frame to the frame,
determining at least one difference between the picture data of the parent frame and the picture data of the frame, and
organizing the picture data pertaining to the difference as a byte stream; and
transmitting, via the data transmitting unit, the byte stream for the at least one frame.

21. The system of claim 20 wherein transmitting the byte stream comprises:
compressing the byte stream;
determining a first data rate for the compressed byte stream;
determining a second data rate for the byte stream;
if the first data rate exceeds the second data rate, transmitting the compressed byte stream; and
if not, transmitting the byte stream.

22. The system of claim 21 wherein compressing the byte stream comprises performing one or more of a Hoffman coding algorithm, an arithmetic coding algorithm and a W-coding algorithm.

23. The system of claim 20 wherein the processor-readable storage medium further contains one or more programming instructions for performing the following:
assigning header information to each frame, wherein the header information comprises one or more of data pertaining to the picture type of the frame, data pertaining to the frame, and data designating the frame as containing picture data.

24. The system of claim 20 wherein organizing all picture data for the frame comprises:
determining whether the picture data includes one or more divisions;
if the picture data includes one or more divisions:
for each division, organizing the picture data corresponding to the division as a division byte stream, and
organizing the division byte streams as a byte stream; and
if not, organizing all picture data for the frame as a byte stream.

* * * * *